(12) United States Patent
Monga

(10) Patent No.: US 7,844,117 B2
(45) Date of Patent: Nov. 30, 2010

(54) METHOD FOR IDENTIFYING IMAGES UNDER DISTORTION VIA NOISE CHARACTERIZATION AND BREGMAN OPTIMAL MATRIX APPROXIMATIONS

(75) Inventor: Vishal Monga, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 672 days.

(21) Appl. No.: 11/851,774

(22) Filed: Sep. 7, 2007

(65) Prior Publication Data

US 2009/0067746 A1    Mar. 12, 2009

(51) Int. Cl.
G06K 9/00  (2006.01)
G06K 9/46  (2006.01)
G06K 9/66  (2006.01)
G06K 9/36  (2006.01)

(52) U.S. Cl. .................. 382/190; 382/181; 382/276; 382/280

(58) Field of Classification Search .................. 382/190, 382/181, 276, 280
See application file for complete search history.

(56) References Cited

U.S. PATENT DOCUMENTS

2004/0258243 A1* 12/2004 Shin et al. .................. 380/210

OTHER PUBLICATIONS

Coskun, B.—"Spatio-temporal transform based video hashing"—IEEE—Nov. 2006, pp. 1190-1208.*
Mihcak, M.—"Robust image hashing via non-negative matrix factorizations"—IEEE—ICASSP—May 14-19, 2006, pp. 225-228.*
Uhle et al.—"Ambience separation from mono recordings"—AES 30th International Conference—Mar. 15-17, 2007, pp. 139-145.*
U.S. Appl. No. 11/742,020 to V. Monga, filed Apr. 30, 2007.
M. Schneider and S. F. Chang, "A Robust Content Based Digital Signature for Image Authentication," Proc. IEEE Conf. on Image Processing, vol. 3, pp. 227-230, Sep. 1996.
R. Venkatesan, S. M. Koon, M. H. Jakubowski, and P. Moulin, "Robust Image Hashing," Proc. IEEE Conf. on Image Processing, pp. 664-666, Sep. 2000.
V. Monga and B.L. Evans, "Robust Perceptual Image Hasing Using Feature Points," Proc. IEEE Conf.. on Image Processing, pp. 677-680, 2004.
I.S. Dhillon and S. Sra, "Generalized Nonnegative Matrix Approximations with Bregman Divergences," UTCS Technical Report #TR-xx-05, Jun. 2005.

(Continued)

*Primary Examiner*—Bhavesh M Mehta
*Assistant Examiner*—Bernard Krasnic
(74) *Attorney, Agent, or Firm*—Oliff & Berridge, PLC

(57) ABSTRACT

An image digest based search approach allows images within an image repository related to a query image to be located despite cropping, rotating, localized changes in image content, compression formats and/or an unlimited variety of other distortions. In particular, the approach allows potential distortion types to be characterized and to be fitted to an exponential family of equations matched to a Bregman distance. Image digests matched to the identified distortion types may then be generated for stored images using the matched Bregman distances, thereby allowing searches to be conducted of the image repository that explicitly account for the statistical nature of distortions on the image. Processing associated with characterizing image noise, generating matched Bregman distances, and generating image digests for images within an image repository based on a wide range of distortion types and processing parameters may be performed offline and stored for later use, thereby improving search response times.

8 Claims, 21 Drawing Sheets

OTHER PUBLICATIONS

D.D. Lee and H.S. Seung, "Algorithms for Non-negative Matrix Factorization," in NIPS, pp. 556-562, 2000.

R. Albright, J. Cox, D. Duling, A. Langville and C. Meyer, "Algorithms, Initializations, and Convergenece for the Nonnegative Matrix Factorization," NCSU Technical Report 81706, Dept. of Mathematics, 2006.

S. Mallat, "A Wavelet Tour of signal Processing," Academic Press, 1999.

* cited by examiner

METHOD FOR IDENTIFYING IMAGES UNDER DISTORTION VIA NOISE CHARACTERIZATION AND BREGMAN OPTIMAL MATRIX APPROXIMATIONS

CROSS-REFERENCE TO RELATED APPLICATIONS

This application is related to U.S. patent application Ser. No. 11/742,020, filed on Apr. 30, 2007, and entitled, "A Method for Identifying Images After Cropping," by Vishal Monga. The disclosure of the related application is incorporated by reference in its entirety.

BACKGROUND

This disclosure relates to the generation and use of image digests to locate images with matching image content.

Due to the popularity of digital technology, more and more digital images are being created and stored every day. The increasing volume of digital images being produced introduces problems for managing image repositories. Often, a user cannot determine if an image already exists in an image repository without exhaustively searching through all the existing images stored in the image repository.

Further complications may arise from the fact that two images that appear identical to the human eye when printed via an output device, such as a display or printer, may have different digital representations when stored electronically on digital storage media. For example, an original digital image stored in a first image file format may be digitally significantly different from, for example, a version of the original digital image file that has been saved in another file format, a version of the original digital image file that has been digitally compressed, a version of the original digital image file that has been digitally enhanced using pixel processing/manipulation operations, a version of the original digital image file that has been manipulated using distinct transforms, a version of the original digital image file with either a higher pixel resolution or a lower pixel resolution than the original digital image; a digital file generated by scanning a printed hardcopy of the original digital image; etc.

Further, some copies of an original image may have been cropped, compressed, resized and/or enhanced. Other copies may have been rotated, or may have been generated with modified control parameters, such as a higher or lower contrast ratio setting than were used to generate the original image. Further, content items within the images may have been manually or electronically edited to add, remove or change small features within the image.

Generally, stored images may go through several distortions and these distorted versions may be either archived in image repositories or made available as query images for use in locating an original or otherwise related image. Recent research in image hashes/digests has addressed this problem to some extent. An image digest is simply a function of the image content that evaluates to a vector that is relatively short, as compared with the image size. For example, see M. Schneider and S. F. Chang, "A robust content based digital signature for image authentication," *Proc. IEEE Conf. on Image Processing*, vol. 3, pp. 227-230, September 1996; R. Venkatesan, S. M. Koon, M. H. Jakubowski, and P. Moulin, "Robust Image Hashing," *Proc. IEEE Conf. on Image Processing*, pp. 664-666, September 2000; and V. Monga and B. L. Evans, "Robust Perceptual Image Hashing Using Feature Points," *Proc. IEEE Conf. on Image Processing*, 2004.

Previous research has focused on the creation of image digests that are robust under common signal and image processing operations, while geometric distortions related to a wide range of remaining distortions have not been addressed. For example, creating an image digest using traditional cryptographic or repository hashes poses a problem in that such image digests are sensitive to very small changes to the image data. As a result, image digests generated from perceptually similar images using such techniques may not be sufficiently similar for use in identifying the images as perceptually similar.

Further, such techniques suffer from significant technical difficulties in capturing image features that are robust under particular distortions. More often than not the selection of robust features using such techniques is ad-hoc and on many occasion lacks generality e.g. it may be dependent on whether the image is outdoor vs. indoor etc. This limits both the development as well as application of such techniques.

SUMMARY

Hence, a need exists for a formal automated approach to matching images under distortions. Such a formal automated approach would provide an ability to search an image repository containing a large number of images to identify distorted and/or modified versions of an identified query image. Preferably, such an image search approach would be able to identify related images quickly, with few misses and a low number of falsely identified images.

The described approach presents a framework for constructing descriptors of image content called image digests that can be used to identify images under a large class of distortions. The described approach treats distortions as additive noise in a suitable transform domain and performs dimensionality reduction matched to the noise distribution. The approach allows image digests to be generated that are robust under perceptually acceptable distortions.

In particular, Bregman optimal low-rank matrix approximations may be employed for the dimensionality reduction. The approach may include two processing steps: a first step that may include characterizing the noise distribution and fitting the noise distribution to an exponential family well suited for characterizing the determined noise distribution; and a second step that may include constructing image digests based on the knowledge of the noise distribution determined by the first step. In exemplary embodiments, the two steps may be performed separately.

For example, in one exemplary embodiment, characterizing the noise distribution associated with a set of images may be performed as an offline step in preparation for supporting user image searches. Further, digests for images stored within an image repository based, in part, on the characterized noise information, may also be generated using an off-line process in preparation for supporting user image searches. Using such an approach, on-line processing may be required only to generate one or more digests associated with a new image introduced to the data repository in support of a search, and to conduct the requested search. However, depending upon the nature and size of the search to be performed, the described processes may be performed using any combination of offline and/or online processing.

The described approach allows a user to search for and identify images stored within a database, or data store, that share image characteristics with a query image despite one or more of a wide variety of distortions affecting one or more of the query image and the images stored within the data store. Image digests matched to identified distortion types may be generated for stored images using Bregman distances matched to the respective distortions, thereby allowing digest based searches to be conducted of the image repository that explicitly account for the statistical nature of respective distortions on the image. As a result, the described approach may be used as a powerful enabler in a wide range of applications that may include, but not limited to, database/image management, intelligent user interfaces, and transaction tracking.

Short descriptors of image content called image digests have been proposed in co-pending U.S. patent application Ser. No. 11/742,020, incorporated by reference above. An image digest can be understood to be a reduced dimension representation of the image where the purpose is not to reconstruct the image but instead to use this short descriptor to identify images under distortions. In particular, U.S. patent application Ser. No. 11/742,020, presented a solution to identity cropped images in a database.

The approach described in U.S. patent application Ser. No. 11/742,020 uses non-negative matrix approximations that provide optimal low-rank approximations to a matrix under a wide class of distance functions known as Bregman divergences. For example, see I. S. Dhillon and S. Sra, "Generalized Non-negative Matrix Approximations with Bregman Divergences," *UTCS Technical Report # TR-xx-05*, June 2005.

The ion-negativity constraint in NNMAs means that matrices B and C used to approximate the original image matrix capture local image features, unlike standard rank-reduction techniques like singular value decomposition (SVD) and principal components analysis (PCA) which are holistic in nature. This in turn means that image digests based on such approximations can better discriminate between visually distinct images. See D. D. Lee and H. S. Seung, "Algorithms for Nonnegative Matrix Factorization," *NIPS*, pages 556-(562, 2000.

Further, NNMAs are available under a whole class of distance measures that may be referred to as "Bregman divergences." This again contrasts with traditional techniques where the approximation is always under the squared distance measure or the Frobenius matrix norm. As described in greater detail below, the choice of the distance measure under which NNMAs are obtained significantly affects robustness to particular distortions. See I. S. Dhillon and S. Sra, Generalized Non-negative Matrix Approximations with Bregman Divergences, UTCS Technical Report # TR-xx-05, June 2005.

However, each image may be affected by a large number of distortions and the distribution of noise may vary for each type of distortion. Therefore, it is difficult to construct algorithms optimized for specific distortions. To date, picking a projection operator that is matched to the distortion affecting an image has been difficult to achieve because of the lack of a formal analytical approach by which to design the appropriate projection operator/dimensionality reduction technique.

The described approach proposes a solution to this problem. Exemplary embodiments of the approach may treat an image data file within a data store as an instance of deterministic variables corrupted by noise whose distribution follows a parameterized exponential family. The approach is based, in part, on an assumption that constructing an image digest that is robust under a specific perceptual distortion is, to a first order, tantamount to picking a projection operator that is matched to the distortion, and based, in part, on a further assumption that performing low-rank matrix approximations under a class of distance measures called as Bregman distances maximizes the probability that the data whose dimension is to be reduced is drawn from an exponential family distribution that is matched to a Bregman distance.

The described approach may be used to characterize virtually any type of distortion that may corrupt the data representing an original image. The approach allows a matched Bregman distance to be determined for virtually any type of distortion by characterizing the distortion as noise and fitting the noise to an exponential family distribution. In exemplary embodiments, a set of images may be transformed to an transform domain using a transform function such as, for example, a discrete wavelet transform (DWT), a discrete cosine transform (DCT), a Fourier transform, an identity transform, i.e., the native pixel domain, or other transform. The transformed image data may then be processed in the transform domain to identify the noise components within the characterize the image noise as an additive element to the transformed image data.

Further, data structures and processes are presented that allow an image repository to support matched Bregman distance image digest based searching using multiple digests. One or more digests may be generated for each identified distortion type using any number of transform functions and other processing parameters in support of the development of appropriate matched Bregman distances and image digest to develop image based searches that will return highly reliable search results with minimal online processing, thus allowing highly accurate match Bregman distance based search results to be returned to a user with minimal processing delay.

The described image digest based search approach allows images within an image repository that are related to a selected image to be located despite cropping, rotating, localized changes in image content, compression formats and/or the application of an unlimited variety of other distortions. In particular, the approach allows possible noise affecting an image to be characterized and to be fitted to an exponential family of equations of the type $\alpha \cdot e^{-\beta \cdot D_\phi(x,\mu)}$ that is matched to a Bregman distance. Image digests that are matched to the identified types of noise may then be generated for respective images using the matched Bregman distances. These image digest may be stored and used to support highly efficient image digest based searches of an image repository.

BRIEF DESCRIPTION OF THE DRAWINGS

Exemplary embodiments will be described with reference to the accompanying drawings, wherein like numerals represent like parts, and in which;

FIG. 22 and FIG. 24, being an original image, the second image in each pair, i.e.

FIG. 23 and FIG. 25 representing a print-scan distorted copy of their respective original images;

DETAILED DESCRIPTION OF EMBODIMENTS

Figure 1:
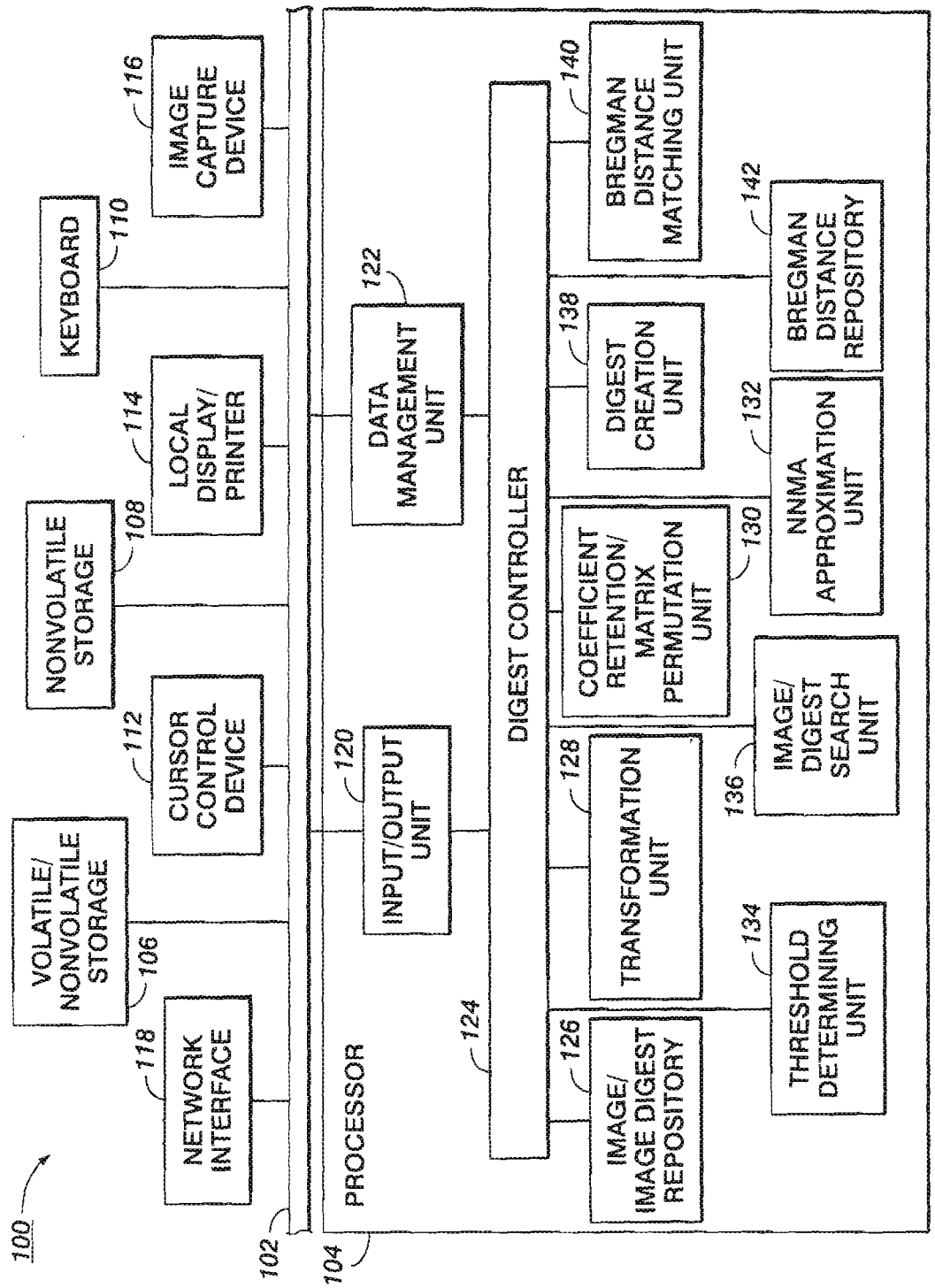
FIG. 1 is a system level block diagram of an exemplary NNMA image digest processing device capable of identifying images under distortion via noise characterization and Bregman optimal matrix approximations.

FIG. 1 is a system level block diagram of an exemplary NNMA image digest processing device 100 capable of identifying images under distortion via noise characterization and Bregman optimal matrix approximations. An NNMA image digest processing device 100, as shown in FIG. 1, may include, a computer system data bus 102 that allows a processor 104 to communicate and exchange information with hardware components of the device such as: volatile/nonvolatile memory 106, which allows the processor 104 to store program instructions in local memory for execution and to store and maintain temporary variables necessary for execution of the stored program instructions; nonvolatile storage 108, which allows processor 104 to access and retrieve larger bodies of data and program instructions for later execution by the processor; keyboard 110, and/or a cursor control device 112 that allows the processor to receive user instructions and/or information and/or feedback; network interface 118 which allows processor 104 to communicate and exchange information with other devices over a LAN/WAN/Internet network as described below; an image capture device 116 which may be used to generate digital images from hardcopy versions of an image; and display/printer 114 which allows processor 104 to format and present feedback and reports to an operator of NNMA image digest processing device 100.

As further shown in FIG. 1, processor 104 may include internal components which allow the processor to communicate with the above-described hardware components to send and receive data and instructions over system bus 102. Such components may include: a digest controller 124 capable of communicating with and controlling an input/output unit 120 that manages communication exchanges with the system bus 102; and a data management unit 122, which allows the controller to maintain a local set of control parameters such as counters, pointers, and segments of executable program instructions currently under execution.

When provided with executable instructions, digest controller 124 may, in addition to performing other functions and in accordance with instructions/commands received from a user, retrieve and initiate control parameters/pointers for the execution of program instructions related to receiving and storing images; charactering distortions within images; generating and storing Bregman distances matched to image distortions; generating new NNMA image digests based on the generated matched Bregman distances; maintaining an NNMA image digest/image repository; generating threshold search parameters for use in searching an image repository based on a created/identified NNMA image digests; and conducting searches and reporting search results based on NNMA image digests generated using Bregman distances matched to the respective image distortions.

Therefore, at startup, as described above, digest controller 124 may retrieve and load program instructions from nonvolatile storage 108 into volatile/nonvolatile memory 106 for execution and may maintain control parameters in data management unit 122 for use in controlling the simultaneous and/or sequential execution of the program instructions retrieved for execution. In this manner, processor 104 may establish, based on stored program instructions retrieved for execution from nonvolatile storage 108, such as a hard-drive and/or firmware storage: (1) a Bregman distance matching unit that may be used to generate Bregman distances that are matched to distortions that may affect images in an image repository and/or may affect images used as query images by users searching the image repository for related images; (2) a Bregman distance repository that may be used to store generated Bregman distances in relation with a described distortion so that the generated Bregman distances may be used to generate NNMA image digests matched to distortions that may affect images in an image repository and/or may affect images used as query images by users searching the image repository for related images; (3) an image/NNMA image digest repository 126 that may be used to store a repository of digital images and NNMA image digests matched to distortions that may affect images in an image repository and/or may affect images used as query images by users searching the image repository for related images associated with each digital image, as described in greater detail below; (4) a transformation unit 128 that receives a digital image represented as an M×N 2-dimensional matrix of spatial image pixel values and that applies one of a plurality of 2-dimensional matrix transform functions to produce an M×N 2-dimensional matrix of coefficients in a transform domain of the image; (5) a transform domain coefficient retention and matrix permutation unit 130 that selectively excludes, e.g., sets to zero, coefficients of the M×N 2-dimensional transform domain representation of an image based on the applied transform function and then applies matrix permutations to produce a matrix $I_F$ of size P×Q based on the applied transform function; (6) an NNMA approximation unit 132 that produces a rank matrix approximation of $I_F$ that includes a matrix $B_{P \times r} \times C_{r \times Q}$; (7) a digest creation unit 138 that generates an NNMA image digest based on the generated matrix approximations $B_{P \times r}$ and $C_{r \times Q}$ and a Bregman distance matched to image noise; (8) a threshold determining unit 134 that assesses NNMA image digests associated with images in an image repository to determine a threshold that may be used to determine whether two images within the image repository are related or unrelated based on a comparison of their respective NNMA image digests; (9) an image search unit 136 that may be used to search one or more image repositories based on an NNMA image digest of a query image of interest and a search threshold value, to locate images within the one or more image repositories that are related, i.e., identical to, or modified or distorted variations of the query image.

Figure 2:
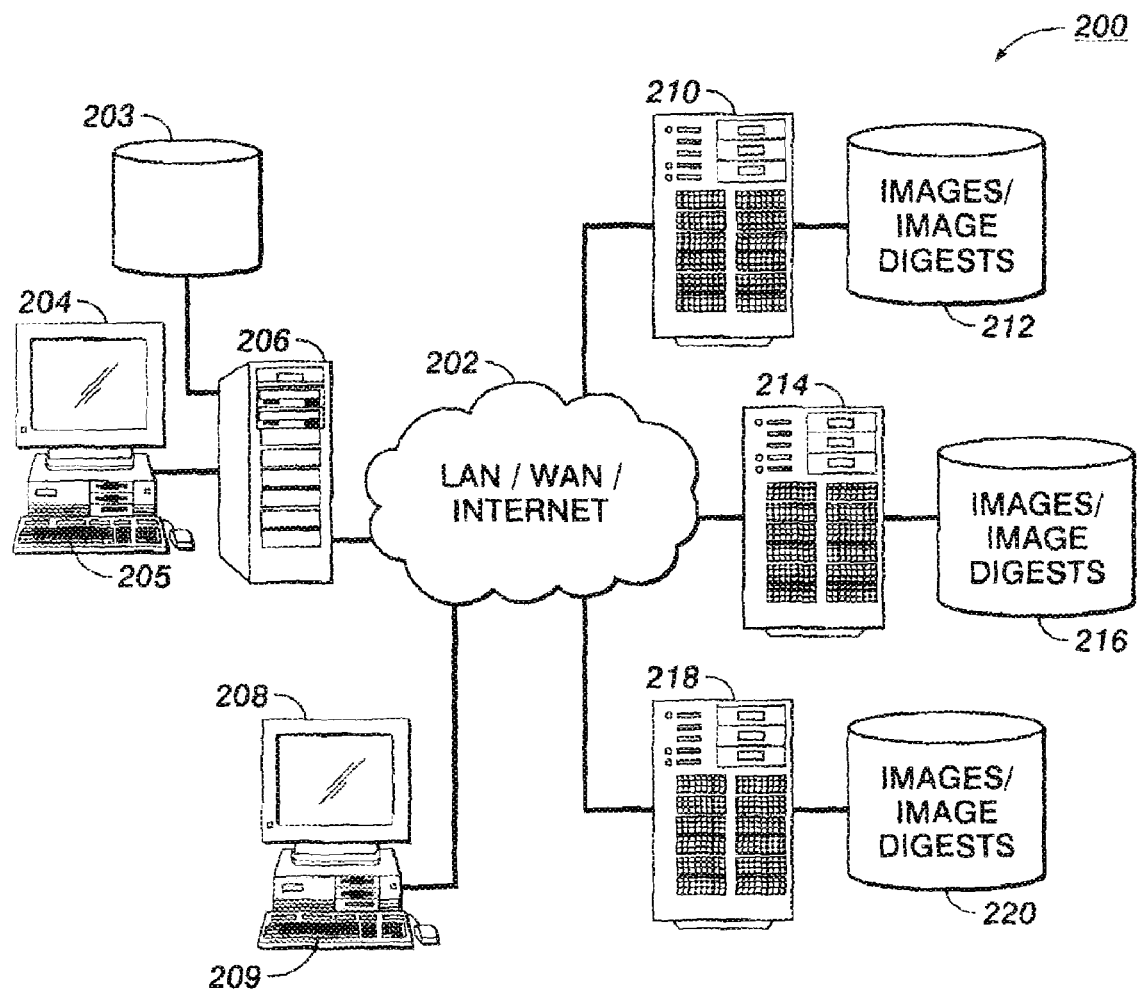
FIG. 2 is a schematic diagram of an exemplary network that provides connectivity between an exemplary NNMA image digest processing device configured as a user workstation and a plurality of NNMA image digest processing devices configured as image repository servers.

FIG. 2 is a schematic diagram of an exemplary network 200 that provides connectivity between an exemplary NNMA image digest processing device configured as a stand-alone user workstation with a local image/image repository, a plurality of NNMA image digest processing devices configured as image repository servers, and a remote client workstation. For example, wide area and/or internet based network 202 may provide connectivity between a stand-alone digest processing device 206, with local image/NNMA image digest repository 203, configured as a standalone workstation with display 204 and keyboard 205, a remote client workstation with a display device 208, processor and keyboard 209, and one or more second digest processing devices configured as NNMA image digest based search repository servers that support remote requests for conducting NNMA image digest based searching using image digests generated using Bregman distances matched to distortions affecting the respective images.

For example, as shown in FIG. 2, image repository server 210 with image/NNMA image digest repository 212, image repository server 214 with image/NNMA image digest repository 218, and image repository server 216 with image/NNMA image digest repository 220 may each service requests for searches from either stand-alone digest processing device 206 with local image/NNMA image digest repository 203, or from a client workstation 208, as described below with respect to FIG. 4.

For example, stand-alone digest processing device 206 with local image/NNMA image digest repository 203 may allow a user to generate NNMA image digests using image digests generated using Bregman distances matched to distortions affecting the respective images, establish thresholds based on the content of local image/NNMA image digest repository 203, and to execute searches against the local image/NNMA image digest repository 203. Further, stand-alone digest processing device 206 may submit an image search request that identifies a digital image and/or NNMA image digest to one or more remote image repository servers to initiate a search for related images stored in the remote image repositories maintained by the respective remote image repository servers. Further, a client workstation 208, that does not support one or more of the features described above with respect to FIG. 1, may also initiate a search request. For example, a client workstation may access an image repository server to browse images on the server. When the user sees an image that the user desires, the user may select an option for the server to search for and return images related to the selected image. In each of the embodiments described above, a user may also submit a digital image produced by scanning a hardcopy image and initiating a search to locate related images based on the scanned digital image. In generating images digests used to identify related images, the respective digest processing device embodiments described above may use image digests matched to distortions that may affect the respective images by using Bregman distances that are matched to distortions that may affect the respective images.

Figure 3:
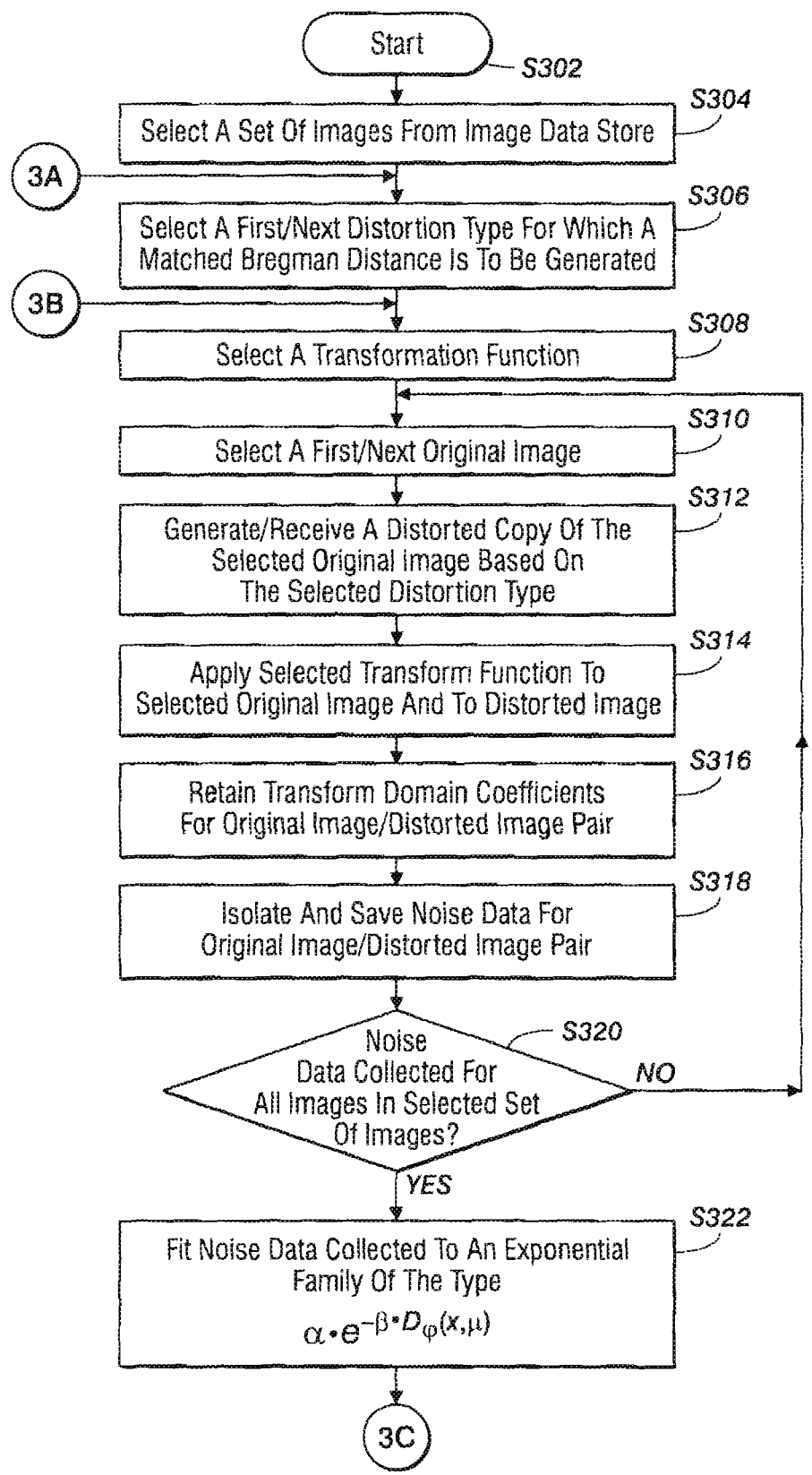
FIG. 3 and FIG. 4 are a flow diagram representing an exemplary method for identifying a Bregman distance that is matched to an image distortion.
Figure 4:
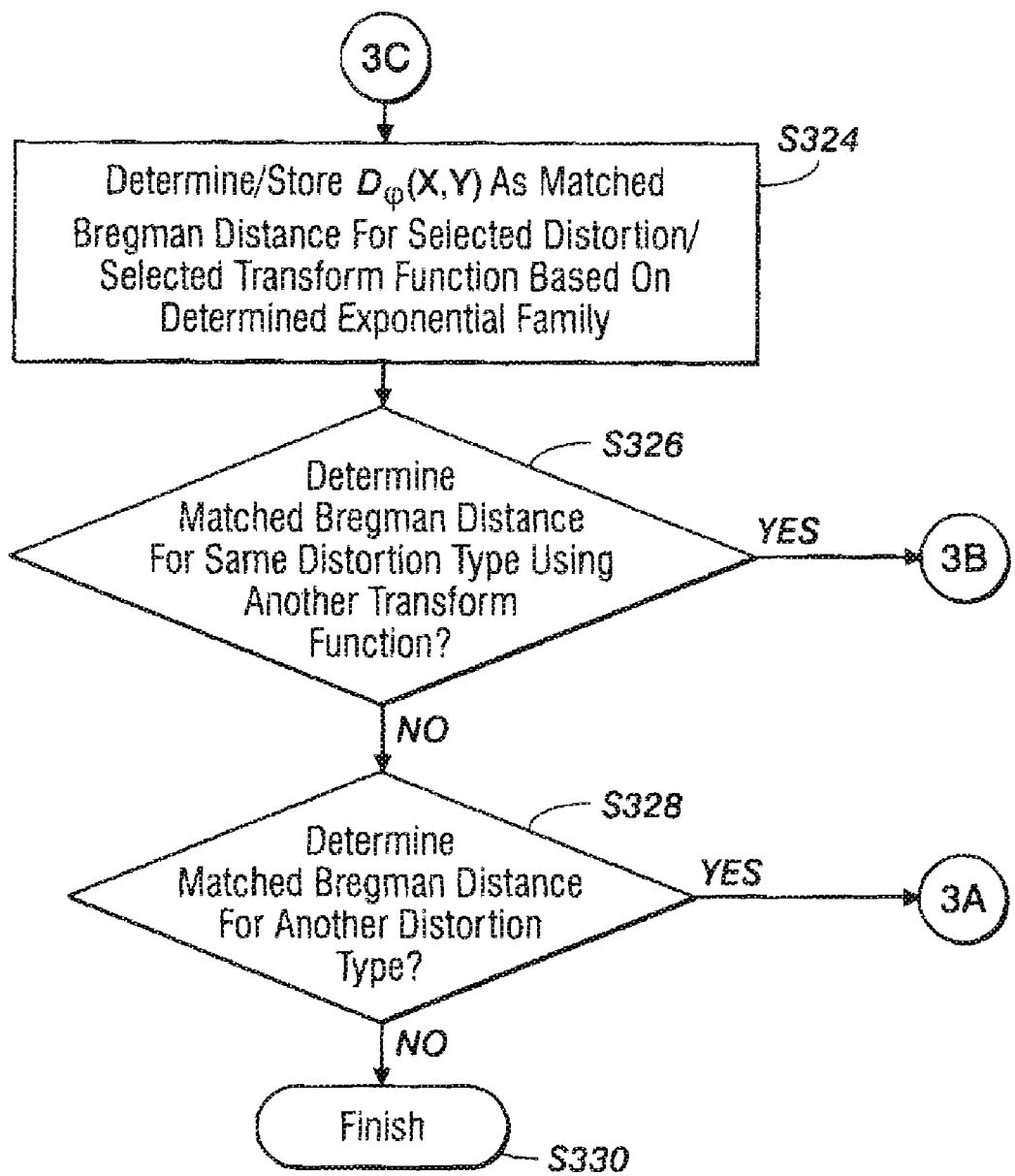

FIG. 3 and FIG. 4 are a flow diagram representing an exemplary method for generating Bregman distances matched to distortions that may affect images in an image repository and/or may affect images used as query images by users searching the image repository for related images. The process flow, described below may be used by, for example, Bregman distance matching unit 140, described above, to generate Bregman distances matched to image distortions for use in generating image digests that are matched to image distortions. The Bregman distances generated may be stored within Bregman distance repository 142, as described in further detail below. As shown in FIG. 3, operation of the method begins at step S302 and proceeds to step S304.

In step S304, a set of images may be selected from an image repository that includes all, or any portion of, the images stored in the image repository, and operation proceeds to step S306.

In step S306, a first/next distortion type for which a matched Bregman distance is to be generated may be selected from a set of predefined distortions, as addressed below with respect Table 1 and Table 2, and operation of the method continues to step S308.

In step S308, a first/next transform function for use in generating the matched Bregman distance may be selected from a set of available transform functions that may be associated with the selected distortion, as addressed below with respect Table 1 and Table 2, and operation of the method continues to step S310.

In step S310, a first/next original image may be selected from the image repository, and operation of the method continues to step S312.

In step S312, a distorted version of the original image may be generated and/or received that includes a distortion of the type selected in step S306. Such a distorted image may be generated internally or may be received from an external source, e.g., over network interface 118, or via image capture device 116. Once a distorted image of the type selected in step S306 is obtained, operation of the method continues to step S312.

In step S314, the selected transform function is applied to both the original image and distorted image, and operation of the method continues to step S316.

In step S316, transform domain coefficients for the original image and related distorted image are retained, and operation of the method continues to step S318.

In step S318, noise data associated with the original and distorted image may be isolated and stored. For example, noise data may be isolated by subtracting the transform domain coefficients of the distorted image from the transform domain coefficients of the original image, resulting in a difference value for each transform domain coefficient. Once noise data has been isolated for the image pair in such a manner, operation of the method continues to step S320.

In step S320, if the Bregman distance matching unit determines that noise data has been collected for all images in the set of images selected in step S304, operation of the method continues to step S322, otherwise, operation of the method returns to step S310.

In step S322, the noise data collected for the selected set of images may be processed and fit to an exponential family of equations of the type $\alpha \cdot e^{-\beta \cdot D_\phi(x,\mu)}$ that is matched to a Bregman distance. As addressed in greater detail below, it is important to note here that this dual interpretation in fact applies to not just Gaussians and squared distance, but to exponential family distributions and Bregman distances given by $$\alpha \cdot e^{-\beta \cdot D_\phi(x,\mu)} \Leftrightarrow D_\phi(x,\mu) \qquad \text{EQN. 1}$$

where $D\phi(x,y)$ is a Bregman distance. Therefore, solving dimensionality reduction problems that minimize Bregman distances have an alternate interpretation as maximizing the likelihood that the higher dimensional data is realized from a multivariate exponential family whose parameters lie in the desired lower-dimensional space. Once the collected noise data is processed and fit to an exponential family of equations of the type $\alpha \cdot e^{-\beta \cdot D_\phi(x,\mu)}$ that is matched to a Bregman distance, operation of the method continues to step S324.

In step S324, Bregman distance matching unit 140 may store $D_\phi(x,\mu)$ from the determined exponential family, described above, as the image distortion matched Bregman distance for the set of processed images using the transform function selected in step S308. The image distortion matched Bregman distance may be stored in Bregman distance repository 142, as described in greater detail below. Once the generated Bregman distance is stored, operation of the method continues to step S326.

In step S326, if the Bregman distance matching unit 140 determines, as addressed in greater detail below with respect to Table 1, that a matched Bregman distance should be generated for the same distortion type using another transform function, operation of the method returns to step S308, otherwise, operation of the method proceeds to step S328.

In step S328, if the Bregman distance matching unit 140 determines, as addressed in greater detail below with respect to Table 1, that a matched Bregman distance should be generated for another distortion type, operation of the method returns to step S306, otherwise, operation of the method proceeds to step S330 and terminates.

In the process flow described above with respect to FIG. 3 and FIG. 4, it is assumed that NNMA image digest processing device 100 includes data structures within, for example, image/image digest repository 126, Bregman distance matching unit 140, and Bregman distance repository 142 that may be used to control operation of the described process and to store intermediate and final results produced by the process.

Table 1 presents a description of an exemplary data structure that may be used by a user to define distortion types and processing instructions that may be used to generate Bregman distances matched to the respective distortion types. As shown in Table 1, such an exemplary data structure may include a storage record for each predefined, or user defined, distortion type. Further, each distortion type may include a distortion description and an array that may include processing parameters for use in controlling generation of one or more Bregman distances matched to the distortion, as well as fields for storing each generated Bregman distance in association with the distortion to which the respective Bregman distance is matched and the control parameters used to generate each respective Bregman distance, e.g., as may be generated using the process described above with respect to FIG. 3.

For example, as shown in Table 1, an Bregman distance repository data structure may include for each predefined, or user-defined distortion: (1) a DISTORTION_TYPE that stores a unique identifier for the distortion; (2) a DISTORTION_DESCRIPTION that describes the distortion using words and phrases that are meaningful to a user, e.g., original image, color print 150 dpi/black and white scan 75 dpi, cropped upper 20%/rotate 20 degrees right, JPEG compression, etc.; (3) a variable length PROCESSING_INFO_ARRAY, each entry in the array including: (a) a PROCESSING_TYPE that stores a unique identifier for a set of processing control parameters; (b) a TRANSFORM_FUNCTION that may be used by the matched Bregman distance process, described with respect to FIG. 3 and FIG. 4, and the image digest generation process described below with respect to FIG. 5 and FIG. 6 to convert images to a selected transform domain; (c) a TRANSFORM_FUNCTION_TYPE that identifies using descriptive text the type of transform function stored in TRANSFORM_FUNCTION, e.g., Identity transform, Fourier, DCT, DWT, etc.; (d) a COEFFICIENT_SELECTION_CRITERIA that provides guidance on which significant coefficients in transformed image matrices generated with TRANSFORM_FUNCTION are to be retained during digest generation processing, e.g., as in the process described below with respect to FIG. 5 and FIG. 6; (e) a MATCHED_BREGMAN_DISTANCE that is used to store a matched Bregman distance function generated using, for example, the exemplary approach matched Bregman distance generation process, described with respect to FIG. 3 and FIG. 4; and (f) a SEARCH_THRESHOLD that may be used to store a search threshold for use in an image repository search using an image digest generated using a match Bregman distance generated using the distortion type processing information contained in the respective PROCESSING_INFO_ARRAY element, as described below with respect to FIG. 5 and FIG. 6.

TABLE 1

Exemplary Bregman Distance Repository Data Structure

| Repository Field Name | Field Description |
| --- | --- |
| DISTORTION_TYPE | Unique identifier for the distortion. |
| DISTORTION_DESCRIPTION | Description of the distortion, e.g., original image, color print 150 dpi/ black and white scan 75 dpi, crop upper 20%/rotate 20 degrees right, JPEG compression, etc. |
| PROCESSING_INFO_ARRAY (1 ... N) | |
| PROCESSING_TYPE | Unique identifier for a set of processing control parameters. |
| TRANSFORM_FUNCTION | Transform function for use in converting image to a transform domain. |
| TRANSFORM_FUNCTION_TYPE | Identifies type of transform function stored in TRANSFORM_FUNCTION, e.g., Identity transform, Fourier, DCT, DWT, etc. |
| COEFFICIENT_SELECTION_CRITERIA | Identifies significant coefficients in transformed image matrices generated with TRANSFORM_FUNCTION. |
| MATCHED_BREGMAN_DISTANCE | Used to store a matched Bregman distance function generated using the described approach. |
| SEARCH_THRESHOLD | Used to store a search threshold generated for the distortion type using the described approach. |

Figure 5:
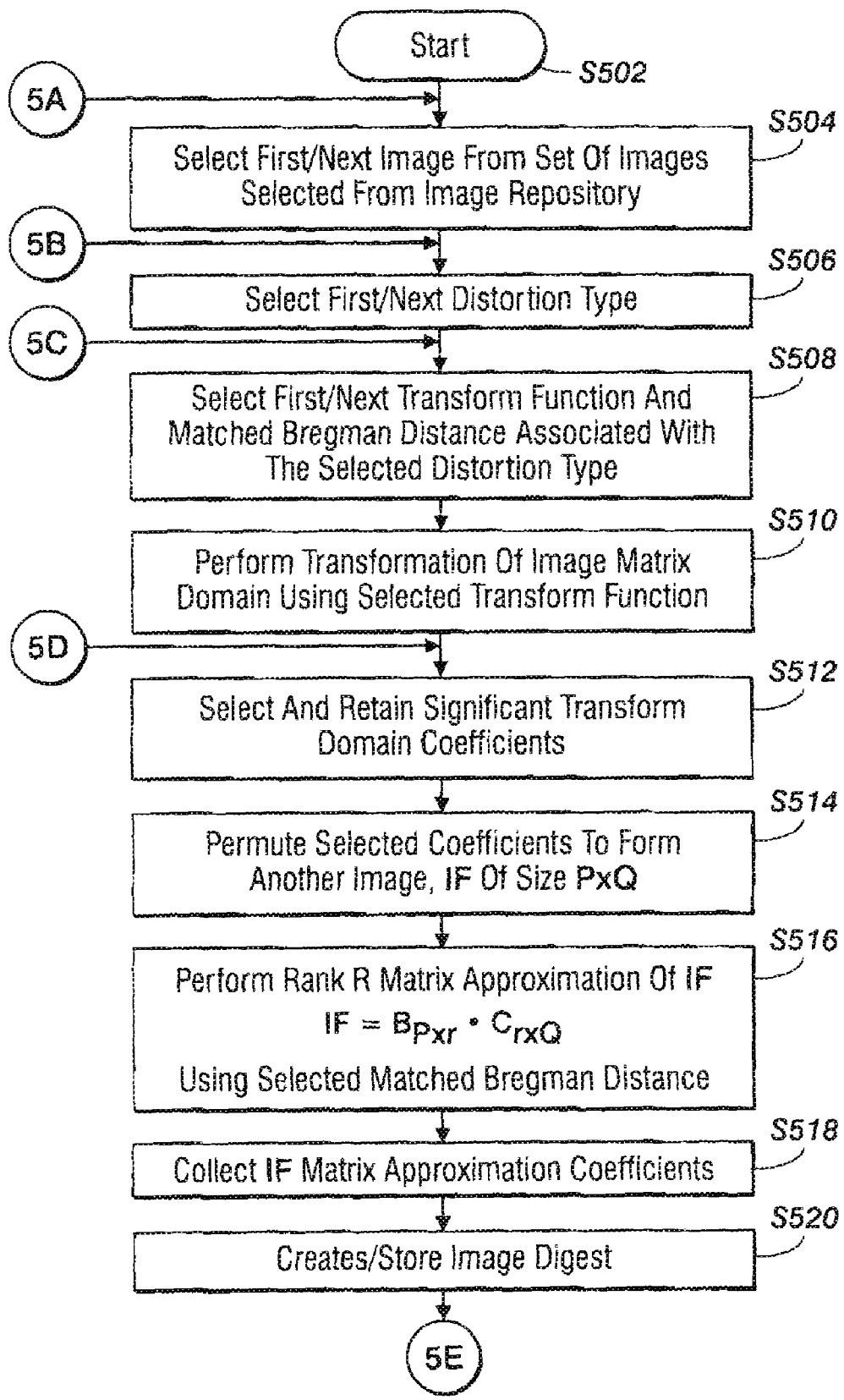
FIG. 5 and FIG. 6 are a flow diagram representing an exemplary method for generating an NNMA based image digests using a pre-generated, matched Bregman distances.
Figure 6:
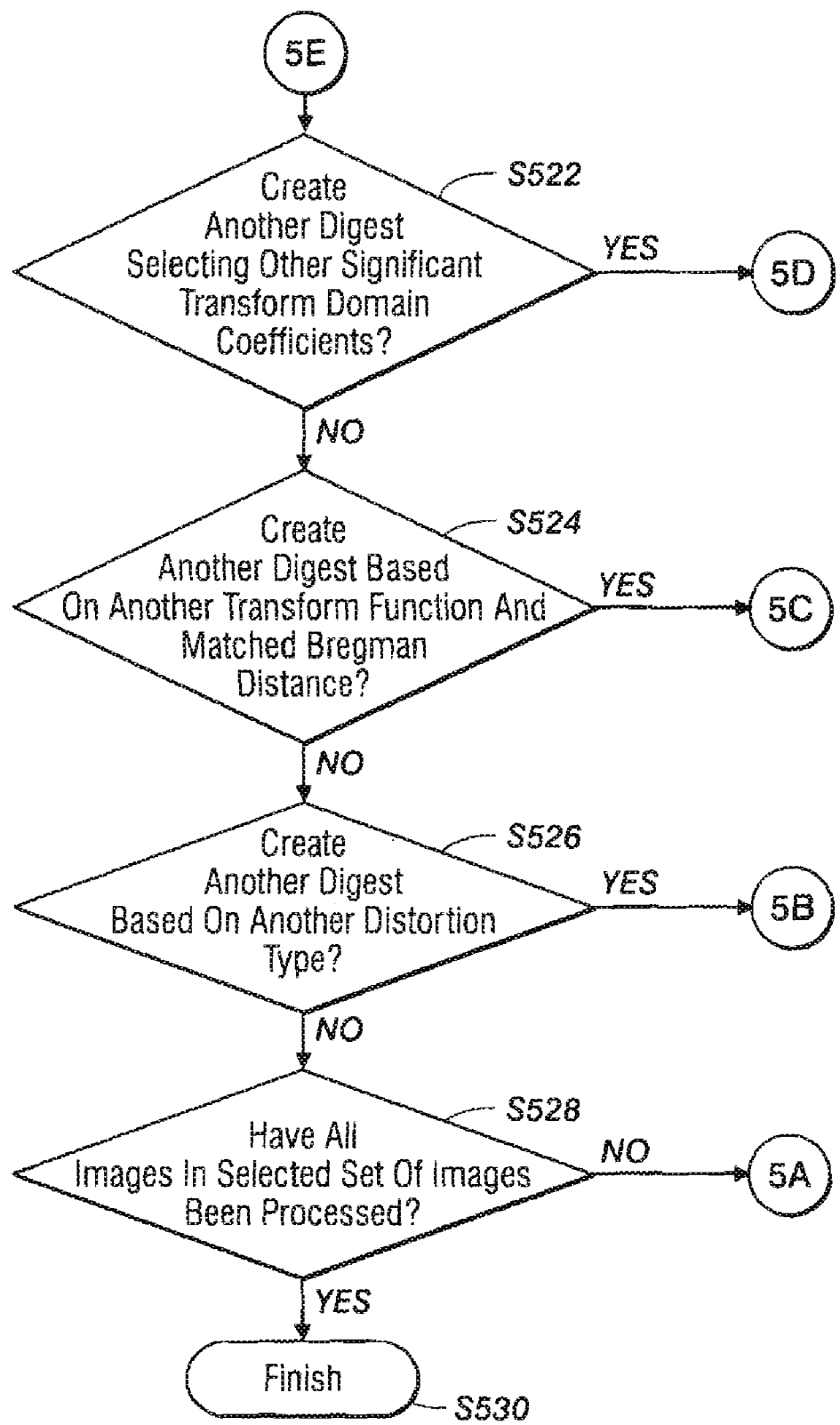

FIG. 5 and FIG. 6 are a flow diagram representing an exemplary method for generating an NNMA image digests using a pre-generated, matched Bregman distances, which may be generated as described above with respect to FIG. 3 and FIG. 4, and which may be stored in relation to a distortion type and a set of processing control parameters as described above with respect to Table 1. The process flow, described below with respect to FIG. 5 and FIG. 6, may be used by, for example, digest creation unit 138 to produce image digests using a matched Bregman distance matched to a specific distortion, resulting in a image digest that is, therefore, matched to a specific distortion.

For example, in one exemplary embodiment of the process flow described below with respect to FIG. 5 and FIG. 6, the image digest generating process may be controlled by one or more combinations of TRANSFORM_FUNCTION, COEFFICIENT_SELECTION_CRITERIA AND MATCHED BREGMAN DISTANCE stored in the PROCESSING_INFO_ARRAY for each DISTORTION_TYPE, as described above with respect to Table 1. The image digests generated as a result of the process flow described below with respect to FIG. 5 and FIG. 6 may be stored within image/image digest repository 126, as described in further detail below.

As shown in FIG. 5, operation of the method begins at step S502 and proceeds to step S504.

In step S504, a first/next image is selected from a set of images selected from an image repository, and operation proceeds to step S506.

In step S506, a first/next distortion type is selected, e.g., from the set of distortion types defined by records stored in Bregman distance repository 142, as described above with respect to Table 1, and operation proceeds to step S508.

In step S508, a first/next set of processing parameters associated with the distortion, e.g., as stored in an array element of PROCESSING_INFO_ARRAY associated with the distortion type selected from the Bregman distance repository, is selected, and operation proceeds to step S510.

In step S510, the selected image may be transformed to a transform domain using a selected transform function, e.g., as stored in field TRANSFORM_FUNCTION of the selected PROCESSING_INFO_ARRAY array element, and operation proceeds to step 512.

In step S512, significant coefficients from the transformed image matrix are retained, e.g., based on information contained in COEFFICIENT_SELECTION_CRITERIA of the selected PROCESSING_INFO_ARRAY array element, and operation proceeds to step S514.

In step S514, the significant coefficients selected from the transformed image matrix are permuted to form an image, IF. The number of rows and columns in permuted image IF depends on the number of significant coefficients retained and the permutation operations performed to generate permuted image IF. In general permuted image IF may be described as having P rows and Q columns, i.e., IF=P×Q. Once the permuted image matrix has been formed, operation proceeds to step S516.

In step S516, a rank R matrix approximation of matrix $I_F$ is performed, as described in greater detail below, resulting in a single row matrix $B_{P\times r}$ and a singe column matrix $C_{r\times Q}$ such that $I_F$ may be closely approximated by the expression $I_F = B_{P\times r} C_{r\times Q}$, and operation of the method continues to step S518.

In step S518, coefficients of single row matrix $B_{P\times r}$ and the coefficients of single column matrix $C_{r\times Q}$, are collected, and operation of the process terminates at step S520.

In step S520, an NNMA image digest is created based on the coefficients of single row matrix $B_{P\times r}$ and the coefficients of single column matrix $C_{r\times Q}$, e.g., by, for example, concatenation, and operation of the process terminates at step S522.

In step S524, if the digest creation unit determines that the PROCESSING_INFO_ARRAY associated with the selected distortion type contains processing information for creating another image digest for the selected distortion type, operation of the method returns to step S508, otherwise, operation of the method continues to step S526.

In step S526, if the digest creation unit 138 determines that another distortion type is contained within Bregman distance repository 142 for which one or more image digests have not been created, operation of the method returns to step S506, otherwise, operation of the method continues to step S528.

In step S528, if the digest creation unlit 138 determines that each image in the selected set of images has been processed to generate one or more image digests based on the distortion types and processing information stored in Bregman distance repository 142, operation of the method continues to step S530 and the process terminates, otherwise, operation of the method continues to step S504.

The above process may be used to generate multiple image digests for an image. The generated image digests may be stored in a repository, e.g., image/image digest repository 126, for later use in support of, for example, user requested searches and/or automated image cataloging. For example, an image digest may be generated for each set of processing parameters associated with each distortion type defined, for example, as described above with respect to Table 1. In one exemplary embodiment, a user may select which distortion types and/or sets of processing information that should be used to generate image digests for an image, thereby, reducing the number of image digests created. In another exemplary embodiment, a user may define a new distortion type, and define a one or more sets of processing parameters to be associated with the distortion type. Such a user-defined distortion may be used to control the generation of one or more matched Bregman distances, as described above with respect to FIG. 3 and FIG. 4, and to control the generation of one or more image digests for each image in a selected set of images, as described above with respect to FIG. 5 and FIG. 6.

In the process flow described above with respect to FIG. 5 and FIG. 6, it is assumed that NNMA image digest processing device 100 includes data structures within, for example, image/image digest repository 126 and Bregman distance repository 142 that may be used to control operation of the described process and to store intermediate and final results produced by the process.

Table 2 presents a description of a data structure that may be used, for example, within image/image digest repository 126, to store image data, image classification data, and image digests generated for the image using, for example, the process described above with respect to FIG. 5 and FIG. 6. For example, an image digest generated for an image based on a selected distortion and a selected set of processing parameters may be stored in association with the image for which the digest was generated, along with an identifier that identifies the distortion type and processing parameters used to generate the image digest. In this manner, the digest may be properly identified, for example, during an image based search, and therefore compared with an image digest generated for the same, or similar distortion using the same, or similar processing parameters.

For example, as shown in Table 2, such an exemplary image/image digest repository may include for each stored image: (1) a UNIQUE_IMAGE_ID that may be used to store a unique identifier for the stored image; (2) an IMAGE_DATA that stores the image matrix that is used to generate visual representations of the stored image; (3) an IMAGE_CATEGORY that may be used to identify an assigned category/subcategory to the image; (4) a DIGEST_INFORMATION_ARRAY (1 . . . N) that may include one or more array elements, and each array element may include includes, each entry in the array including: (a) a DISTORTION_TYPE that stores a unique identifier for the distortion type associated with the generated image digest; (b) a PROCESSING_TYPE that identifies a distortion and set of processing parameters, e.g., as described above with respect to Table 1, and which have been used to generate an image digest for the image an stored in the current array element; (c) a GENERATED_DIGEST that stores an image digest generated for the image using the PROCESSING_TYPE stored in the current array element, as described above; (d) an IMAGE_SET_ID_ARRAY (1 . . . M) that may be used to store information related to digest based images searches for which the current image was included in the search results, each entry in the array including: (i) a UNIQUE_SEARCH_ID that is a unique identifier of a user search for which the image was returned in a search result; (ii) a SEARCH_IMAGE_ID which may store a UNIQUE_IMAGE_ID of a source image used as the basis for unique search identified by the UNIQUE_SEARCH_ID stored in the same IMAGE_SET_ID_ARRAY element; and (iii) a DISTANCE_VALUE that may be used to store s calculated Bregman distance between the image digest for the query image and the image digest for the current image, which resulted in the image being returned in the query image results.

TABLE 2

Exemplary Image Digest Repository Data Structure

| Repository Field Name | Field Description |
| --- | --- |
| UNIQUE_IMAGE_ID | Unique identifier for stored image. |
| IMAGE DATA | Image matrix data constituting a stored image. |
| IMAGE_CATEGORY | Identifies a manually assigned category/subcategory to which the image is assigned. |
| DIGEST_INFORMATION_ARRAY (1 . . . N) | One array element for each digest generated for the image. |
| DISTORTION_TYPE | Unique identifier for the distortion type associated with the generated image digest |
| PROCESSING_TYPE | Uniquely identifies processing control parameters (Table 1) used to produce GENERATED_DIGEST, below. |
| GENERATED_DIGEST | Digest generated as result of the described digest generating process using the processing identified in PROCESSING_TYPE, above. |
| IMAGE_SET_ID_ARRAY (1 . . . M) | Identifies potential image groups based on digest based search results. |
| UNIQUE_SEARCH_ID | Unique identifier of a user search for which the image was returned in a search result. |
| QUERY IMAGE_ID | UNIQUE_IMAGE_ID of source image for search. |

TABLE 2-continued

Exemplary Image Digest Repository Data Structure

| Repository Field Name | Field Description |
|---|---|
| DISTANCE_VALUE | Calculated Bregman distance between the image digest for the query image and the image digest for the current image, which resulted in the image being returned in the query image results. |

For example, the IMAGE_SET_ID_ARRAY (1 ... M) described above, may be used to assign an image to one or more image groups based on the image searches for which the image was returned in the search results. For example, in one exemplary embodiment, assuming that the image was returned in the results generated for one or more digest based searches, each search may be viewed as a category or subcategory of images to which the image may be initially assigned. In another exemplary embodiment, the image may be associated with only one or more of the respective search categories or subcategories, based on, for example, the searches with the smallest Bregman distances between the image and the respective query image. Such an approach may be used to automatically sort a database into a plurality of unique and/or overlaying categories or subcategories based on similar image characteristics.

Figure 7:
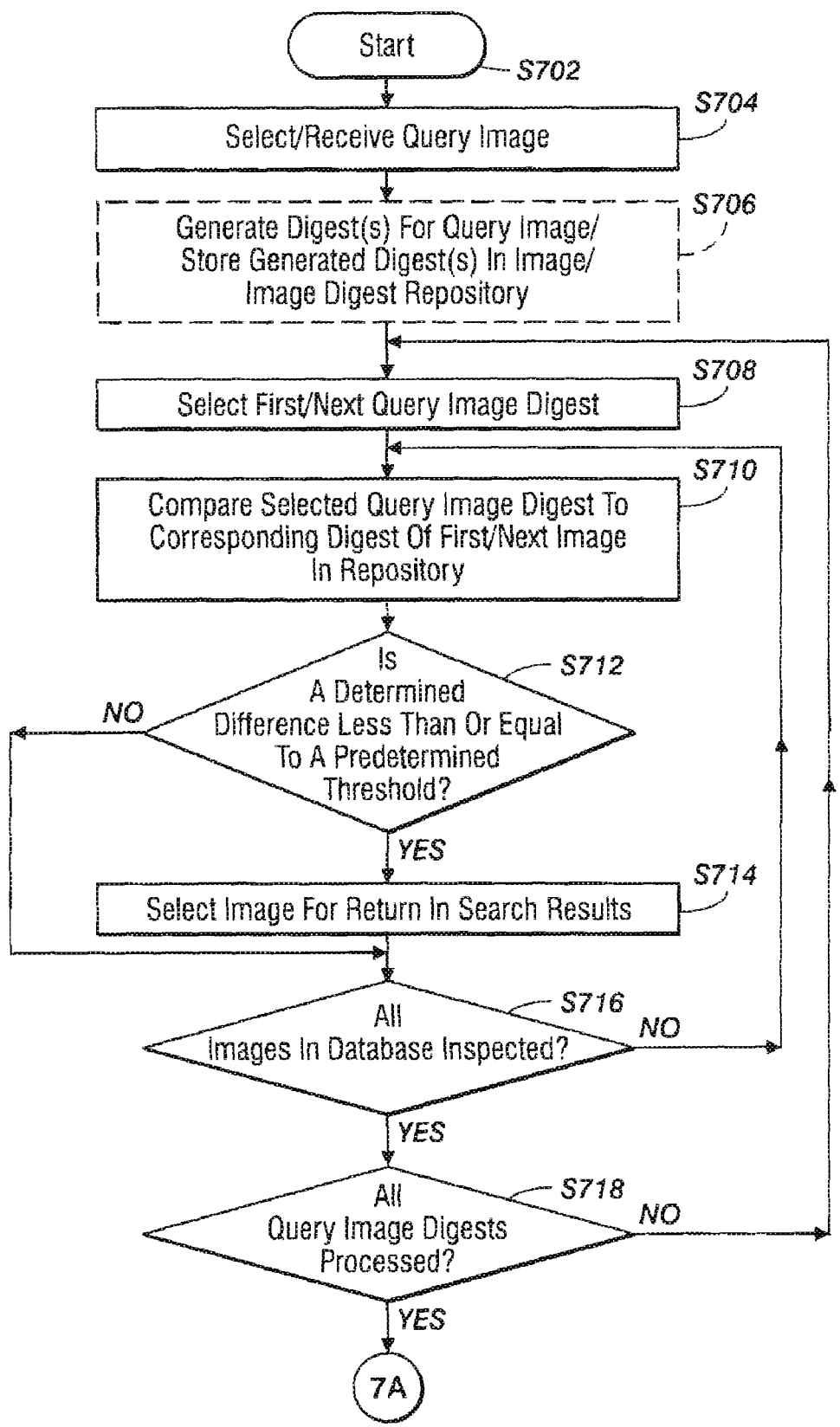
FIG. 7 and FIG. 8 are a flow diagram representing an exemplary method for conducting an NNMA image digest based search of an image repository using pre-generated images digests based on matched Bregman distances.
Figure 8:
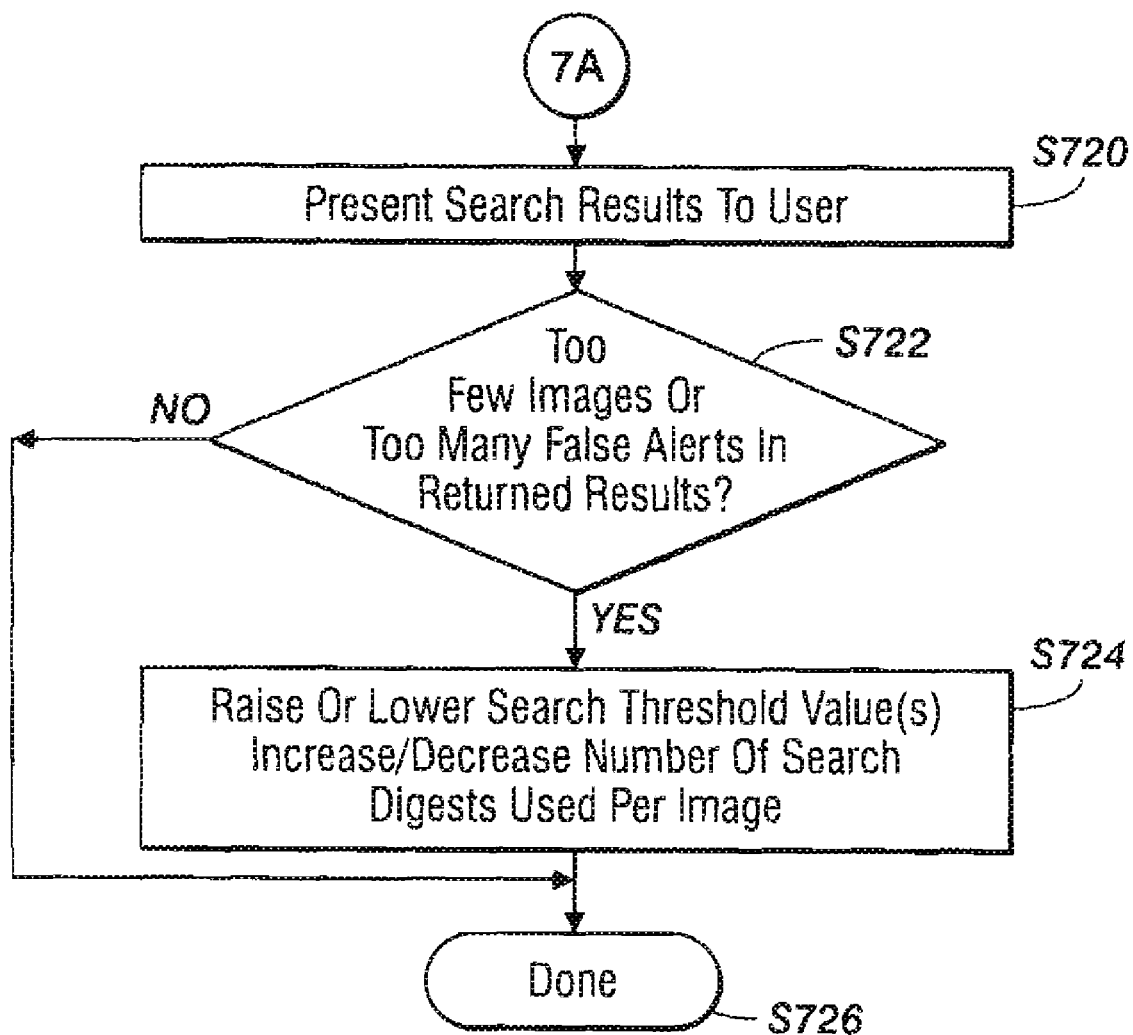

FIG. 7 and FIG. 8 are a flow diagram representing an exemplary method for conducting an NNMA image digest based search of an image repository that may be performed, for example, by image/digest search unit 136. In the exemplary process described below with respect to FIG. 7 and FIG. 8, a search for a related image based on a selected query image may be based on a comparison of one or more image digests associated with the selected query image with one or more corresponding image digests associated with each stored image. The exemplary process described below with respect to FIG. 7 and FIG. 8 assumes that generated images digests are stored in association with a distortion type and a processing type, as described above with respect to Table 1. Further, the exemplary process described below with respect to FIG. 7 and FIG. 8 assumes that images are stored in association with their respective image digests, and that each image digest is stored in association with a distortion type and a processing type, as described above with respect to Table 2.

As shown in FIG. 7, operation of the method begins at step S702 and proceeds to step S704.

In step S704, a query image may be selected based, for example, on a review of an image repository to be searched, a review of another local or remote image repository, or received via a network connection, or an imaging device such as a local or remote image scanner or camera, and operation of the method proceeds to step S706.

In step S706, if the query image has been newly received and added to image/image digest repository 126, a set of distortion matched image digests may be generated and stored in image/image digest repository 126 in association with the query image using, for example, the processes described above with respect to FIGS. 5-6. However, if the query image has been selected from the image/image digest repository, and a complete set of distortion matched image digests have already been generated for the image based, for example, on the processes described above with respect to FIGS. 3-4 and FIGS. 5-6, no additional digests need to be generated. Once the image/digest search unit determines that the query image has all the image digests needed, based, for example, on a standard set of distortion types/processing parameters, and/or on a set of distortion types/processing parameters specified in the search request, operation of the method continues to step S708.

In step S708, a first/next query image digest may be selected, e.g., from Bregman distance repository 142, and operation of the method continues to step S710.

In step S710, the selected query image digest may be compared to a corresponding image digest associated with a first/next image selected from the image repository to determine a difference between the selected query image digest and the corresponding image digest associated with the currently selected repository image. For example, assuming that a data structure similar to that described above with respect to Table 2 is used by image/image digest repository 126, the selected query image digest may be matched with a corresponding image digest by comparing the DISTORTION_TYPE/PROCESSING_TYPE combination associated with the selected query image digest with the DISTORTION_TYPE/PROCESSING_TYPE combination associated with each image digest associated with each stored image. Once the query image digest has been compared with a corresponding image digest from the currently selected image from the image repository, operation of the method proceeds to step S712.

If, in step S712, a difference, e.g., a distance, between the selected query image digest and a corresponding digest of the selected image in the image repository meets a predetermined threshold criteria, e.g., the difference is less than or equal to a predetermine threshold level, operation of the method proceeds to step S716, otherwise operation of the method proceeds to step S714.

In step S714, the selected image from the image repository is marked for inclusion in the search results, and operation of the method proceeds to step S716.

If, in step S716, image/digest search unit 136 determines that each image in the image repository has been searched, operation of the method proceeds to step S718, otherwise operation of the method returns to step S710.

If, in step S718, image/digest search unit 136 determines that all query image digest have been processed, operation of the method proceeds to step S720, otherwise operation of the method returns to step S708.

In step S720, a list or set of marked images, each selected in step S714 for inclusion in the search results, may be output to the user via a display device and/or printer, and operation of the method proceeds to step S722.

If, in step S722, the user is satisfied with the number of images returned by the search and is satisfied with the number, if any, of false matches included in the search results, operation of the method may proceed to step S726 and the process terminates, otherwise operation of the method proceeds to step S724.

In step S724, the threshold may be raised to increase the number of images returned by a search, or lowered to reduce the possibility of false matches in subsequent digest based searches, and operation terminates at step S726. Further, the number of image digests used in the search may be raised to increase the number of images returned by a search, or lowered to reduce the possibility of false matches in subsequent digest based searches. For example, if the number of images returned by a search is below a predetermined threshold for the number of images to be returned by a search, the digest processor may automatically increase the search threshold and may, if so configured, automatically re-execute the search. Further, if a user reports that a large number of unrelated images have been returned in the search results, the digest processor may decrease the search threshold in preparation for a subsequent search executed by the user.

Figure 9:
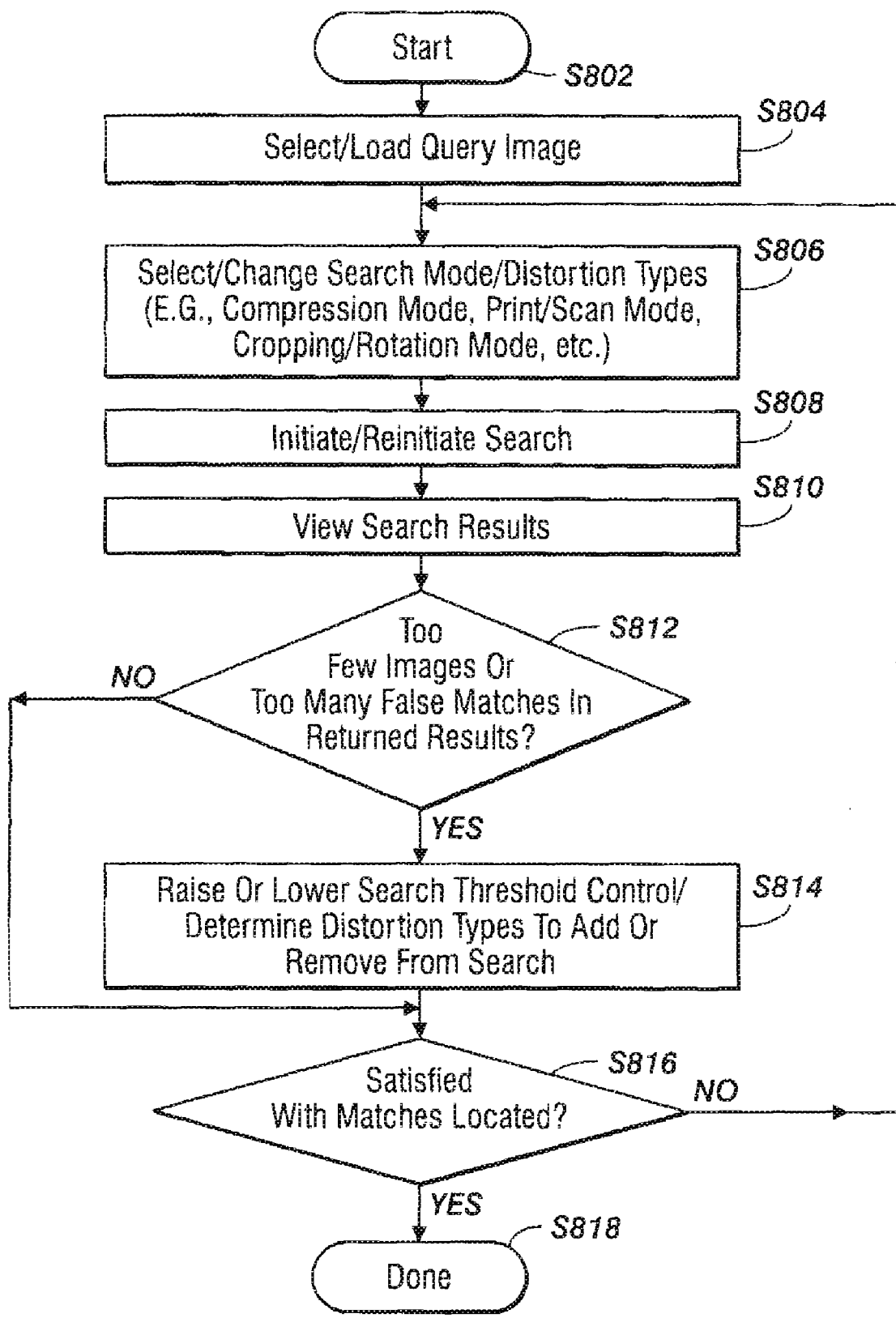
FIG. 9 is a flow diagram representing, from a user's perspective, an exemplary method for conducting an NNMA image digest based search of an image repository using pre-generated images digests based on matched Bregman distances.

FIG. 9 is a flow diagram representing, from a user's perspective, an NNMA image digest based search of an image repository using pre-generated matched Bregman distance based image digests. For example, the process flow shown in FIG. 9 presents actions and decisions that may be made by a user via a user interface when exemplary NNMA image digest processing device 100, described above, performs the exemplary NNMA image digest based search described above with respect to FIG. 7 and FIG. 8. As assumed in the process described above with respect to FIG. 7 and FIG. 8, the exemplary process described below with respect to FIG. 9 may also assume that generated images digests are stored in association with a distortion type and a processing type, as described above with respect to Table 1. Further, the exemplary process described below with respect to FIG. 9 may also assume that images are stored in association with their respective image digests, and that each image digest is stored in association with a distortion type and a processing type, as described above with respect to Table 2.

As shown in FIG. 9, operation of the method begins at step S802 and proceeds to step S804.

In step S804, the user may select, or load, a query image based, for example, on a review of an image repository to be searched, a review of another local or remote image repository, or retrieved via a network connection or an imaging device such as a local or remote image scanner or camera, and operation of the method proceeds to step S806.

In step S806, the user may parse through a selection of search modes and/or distortion types that the NNMA image digest processing device and corresponding image repository is configured to support. For example, a first search mode may be configured to search for distorted versions of the query image that would occur if the image has been stored in one or more alternate image compression formats, such as compressed TIFF, JPEG, MPEG, etc., formats. A second search mode may be configured to search for distorted it versions of the selected query image that would occur if the image has been printed and scanned using different combinations of printer/scanner characteristics, e.g., printing in black/white 300 dpi and scanning in grayscale at 600 dpi, or printing in color at 300 dpi and scanning in color at 300 dpi, etc. A third search mode may be configured to search for distorted versions of the selected query image that would occur if the query image had been cropped and/or rotated in various ways, e.g., cropped 20% from the right side and rotated 10 degrees clockwise, cropped 25% from the left and rotated 15 degrees counter-clockwise, etc.

Exemplary NNMA image digest processing device embodiments may be configured with any number of pre-configured search modes similar to those described above, and/or may allow a user to build one or more user defined search modes. For example, a user may parse through a listing of distortion descriptions supported by the NNMA image digest processing device, e.g., as described by fields included in Table 1, and may select one or more distortion types for inclusion in a user defined search mode based on the descriptions provided. Exemplary NNMA image digest processing device embodiments may further include a user interface that allows a user to define new distortion types, for example, by defining a new distortion type based, for example, on the fields described above with respect to Table 1, and to generate a complete set of distortion matched image digests based, for example, on the processes described above with respect to FIGS. 3-4 and FIGS. 5-6. Once the user has selected a pre-defined or user defined search mode, operation of the method continues to step S808.

In step S808, a query image digest based search of the image repository is initiated, using one or more matched Bregman distance based image digests associated with the query image and search mode selected by the user, and operation of the method continues to step S810.

In step S810, the user may be presented with, via a user display interface, a set of images identified by the search, and operation of the method proceeds to step S812.

If, in step S812, the user determines that either too few matches or too many false matches have been returned in the search results, operation of the method may, based on instructions from the user received via the user interface, continue to step S814, otherwise, operation of the method continues to step S816.

In step S814, the user may, via a user interface, raise the difference threshold used to identify digest based matches to increase the number of images returned by a search, or the user may, via a user interface, lower the difference threshold to reduce the possibility of false matches in subsequent digest based searches. In addition, the user may, based on the distortion types associated with accurate image matches and/or distortion types associated with false matches, identify distortion types to add to and/or remove from the currently selected mode. Once the threshold values and/or search mode distortion types are adjusted, operation of the method may proceed to step S816.

If, in step S816, the user is not satisfied with the search results, operation of the method may return, based on user supplied input via the user interface, to step S806, otherwise operation of the method may terminate at step S818.

Figure 10:
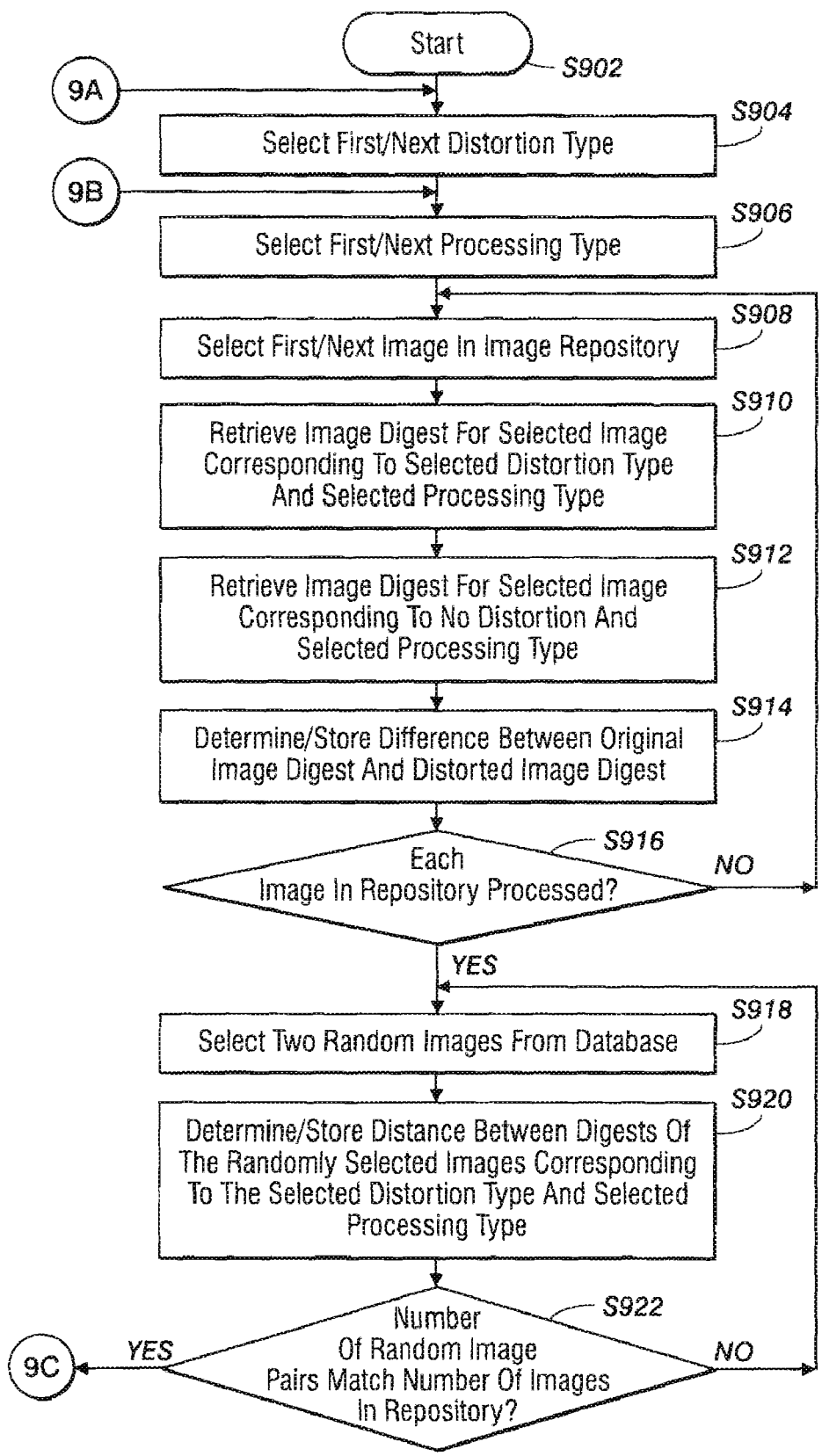
FIG. 10 and FIG. 11 are a flow diagram representing an exemplary method for determining threshold values for use in conducting an NNMA image digest based search of an image repository using matched Bregman distances.
Figure 11:
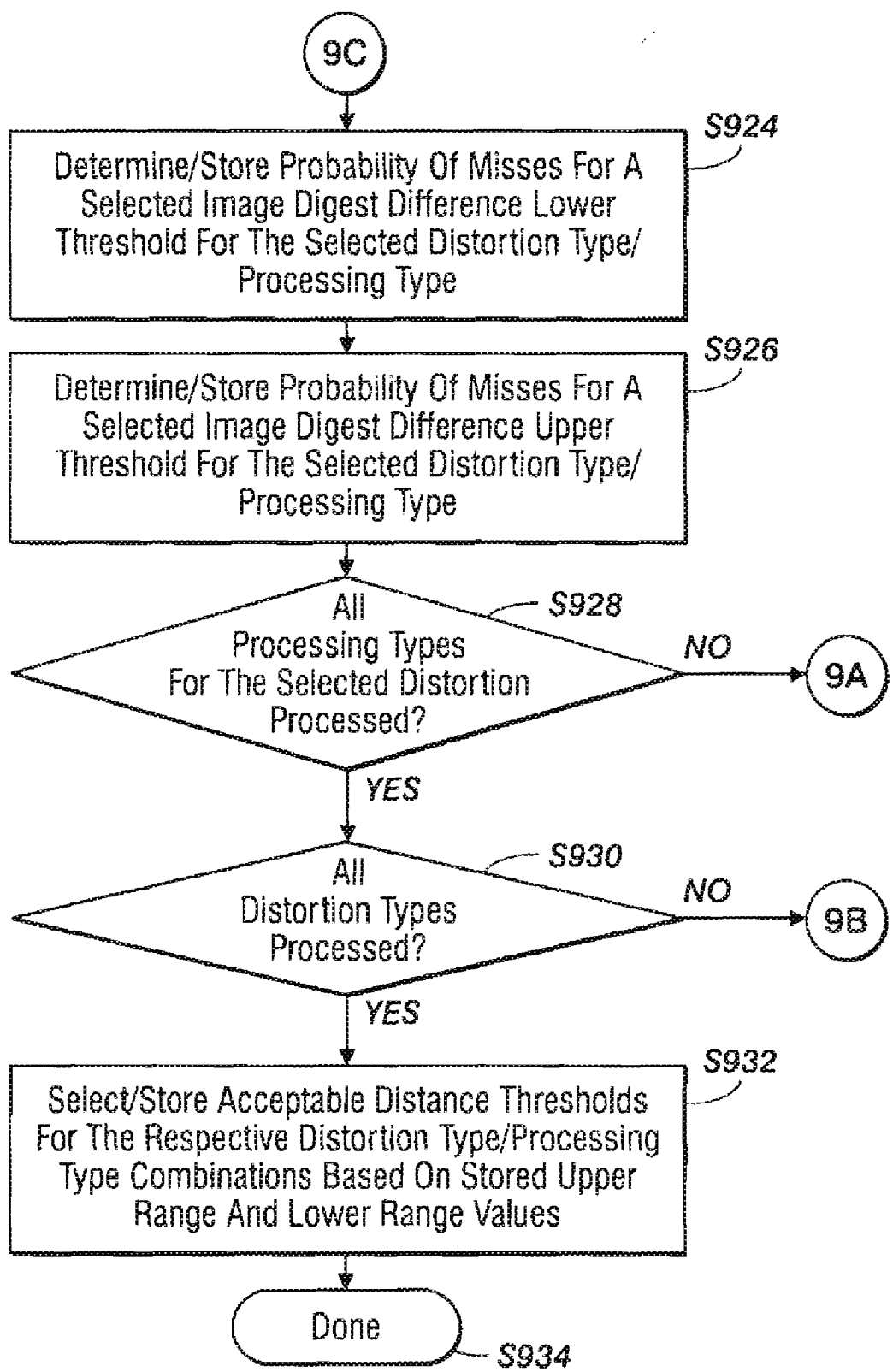

FIG. 10 and FIG. 11 are a flow diagram representing an exemplary method for determine an NNMA image digest threshold for use in conducting an NNMA image digest based search of the image repository, as described above with respect to FIG. 7, FIG. 8 and FIG. 9. In one exemplary image digest processing device 100 embodiment, the exemplary process described with respect to FIG. 10 and FIG. 11, below, may be performed by threshold determining unit 134 and the image digest threshold resulting from the process may be stored in association with a unique distortion type/processing type combination in a data structure based, for example, in the SEARCH_THRESHOLD field of the Bregman distance repository data structure described above with respect to Table 1.

As shown in FIG. 10, operation of the method begins at step S902 and proceeds to step S904.

In step S904, the threshold determining unit may select a first, or next, image distortion type from, for example, the Bregman distance repository 142, and operation of the method proceeds to step S906.

In step S906, the threshold determining unit may select a first, or next, processing type associated with the selected distortion type from, for example, the Bregman distance repository 142, and operation of the method proceeds to step S908.

In step S908, the threshold determining unit may selected a first/next image from, for example, image/image repository 126, and operation of the method proceeds to step S910.

In step S910, the threshold determining unit may retrieve an image digest for the selected image corresponding to the selected distortion type and the selected processing type, and operation of the method proceeds to step S912.

In step S912, the threshold determining unit may retrieve an image digest for the selected image corresponding to no distortion and the selected processing type, and operation of the method proceeds to step S914.

In step S914, the threshold determining unit may determine and store a difference between the image digest for the selected image corresponding to no distortion and the image digest for the selected image corresponding to the selected distortion type and processing type, and operation of the method proceeds to step S916.

If, in step S916, the threshold determining unit determines that a statistically significant number of images from the image repository have been processed, operation of the method proceeds to step S918, otherwise, operation of the method returns to step S908.

In step S918, the threshold determining unit may select two images at random from the image repository, and operation proceeds to step S920.

In step S920, the threshold determining unit may determine and store a difference between the image digests for the randomly selected images corresponding to the selected distortion type and the selected processing type, and operation of the method proceeds to step S922.

If, in step S922, the threshold determining unit determines that the number of random image pairs for which one or more distance values have been generated is greater than or equal to the number of original images processed, operation proceeds to step S924, otherwise, operation returns to step S918.

In step S924, the distance values generated in step S914 are evaluated to determine an image digest difference lower threshold for the selected distortion type/processing type combination and a probability that the selected lower threshold may result in misses, i.e., the probability that a search based on the selected distortion type/processing type combination and the selected image digest difference lower threshold may fail to identify an image in the data repository that matches the query image. The selected lower threshold value may be stored for subsequent review by a user, as described in greater detail below with respect to step S932. For example, if a search threshold is selected that is greater than all the distance values determined in step S914 for the currently selected distortion type/processing type combination, the likelihood of missing a valid related image, based on a comparison of image digests generated for the currently selected distortion type/processing type combination is zero. However, if the threshold selected is lower than one or more distance values determined in step S914 for the currently selected distortion type/processing type, there is a possibility that a search using the selected threshold may fail to identify an image in the image repository that is related to a selected query image. For example, a measure of the likelihood of a digest based search missing a valid related image based on a comparison of a single image digest may be determined by dividing the number of distance values determined in step S914 for the corresponding distortion type/processing type combination that exceed a selected lower threshold by the total number images in the repository. Once a measure of a likelihood of a miss is determined for the selected image digest difference lower threshold for the selected distortion type/processing type combination, operation proceeds to step S926.

In step S926, the distance values generated in step S920 are evaluated to determine an image digest difference upper threshold for the selected distortion type/processing type combination and a probability that the selected upper threshold may result in false matches, i.e., the probability that a search based on the selected distortion type/processing type combination and the selected image digest difference upper threshold may identify an image in the data repository as being related to the query image, when it is not. The selected upper threshold value may be stored for subsequent review by a user, as described in greater detail below with respect to step S932. For example, if a search threshold is selected that is less than all the distance values determined in step S920 for the currently selected distortion type/processing type combination, the likelihood of falsely identifying an image as related to the query image when it is not, based on a comparison of image digests generated for the currently selected distortion type/processing type combination is zero. However, if the threshold selected is higher than one or more distance values determined in step S920 for the currently selected distortion type/processing type, there is a possibility that a search based on a comparison of image digests generated for the currently selected distortion type/processing type combination may falsely identify an image in the image repository as being related to a selected query image. For example, a measure of the likelihood of a digest based search falsely identifying a image as being related to the query image based on a comparison of a single image digest may be determined by dividing the number of distance values determined in step S920 for the corresponding distortion type/processing type combination that fall below the selected lower threshold by the total number images in the repository. Once a measure of a likelihood of a false identification is determined for the selected image digest difference upper threshold for the selected distortion type/processing type combination, operation proceeds to step S928.

If, in step S928, the threshold determining unit determines that all processing types for the selected distortion type have been processed, operation proceeds to step S930, otherwise, operation returns to step S906.

It, in step S930, the threshold determining unit determines that all distortion types have been processed, operation proceeds to step S932, otherwise, operation returns to step S904.

In step S932, a user may be notified of the determined measures of a likelihood of a miss and a determined measures of a likelihood of a false return for a set of one or more automatically selected search thresholds determined for a currently selected set of distortion type/processing type combinations. The user may be provided an opportunity to manually adjust the search thresholds for the currently selected distortion type/processing type combinations and/or to provide an acceptable upper bound for the probability of misses, and an acceptable upper bound for the probability of false alarms for individual distortion type/processing type combinations or for the currently selected distortion type/processing type combinations. For example, a user may be provided an opportunity to increase or decrease a number of distortion type/processing type combinations to be used in a search. In this manner, an exemplary NNMA image digest processing device 100 may adjust a number of distortion type/processing type combinations used in a search and the corresponding search thresholds to accommodate a user's indicated upper bound values. Once an acceptable set of distortion type/processing type combinations and corresponding search threshold values is determine for use in subsequent digest based image searches, operation proceeds to step S934, and the process terminates.

In one exemplary embodiment, the probability of a miss or a false alarm for a single image digest associated with a unique distortion type/processing type combination may be determined as indicated below. For example, let v(I) denote the image digest vector extracted from the image I. Also, let I' denote a cropped version of I and let J denote an altogether different image from I. It is desired that, $$Pr(\|v(I)-v(I')\|<\tau)>1-\mu_1 \quad \text{EQN. 2}$$

and $$Pr(\|v(I)-v(I')\|<\tau)>1-\mu_1 \quad \text{EQN. 3}$$

where $0<\mu_1, \mu_2<1$ and the goal is to make them as close to 0 as possible. Therefore to evaluate the statistical performance of the image digest, we may define $$\text{Probability of miss: } P_M(\tau)=Pr(\|v(I)-v(I')\|>\tau) \quad \text{EQN. 4}$$

$$\text{Probability of false alarm: } P_F(\tau)=Pr(\|v(I)-v(J)\|<\tau) \quad \text{EQN. 5}$$

Note the probabilities above are defined by conducting tests over a large number of images. In the test results discussed in greater detail below with respect to FIG. 27 FIG. 28 and FIG. 29, image digests were obtained from one-hundred and fifty different images in a repository. For each image, distorted versions of the image were created by printing an original image at 150 dpi, scanning the image at 72 dpi, and introducing up to 15% rotation and up to 30% cropping along the vertical and horizontal directions. In the context of the processes described above with respect to FIG. 3 through FIG. 11, such a combination of distortions could be defined as a single distortion type with one or more associated processing types, each distortion type/processing type combination having its own stored distance threshold, or as three separate distortion type with one or more associated processing types, each distortion type/processing type combination having its own stored distance threshold.

Figure 12:
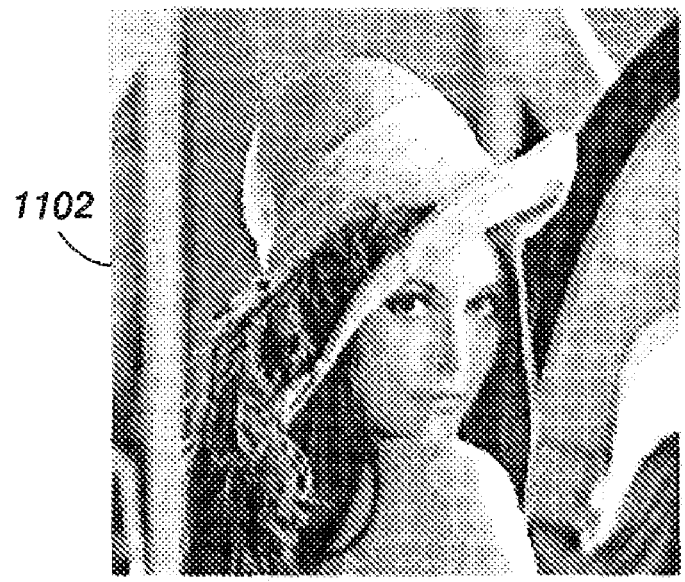
FIG. 12 and FIG. 13 are examples of related images, including an original image and a distorted version of the original image corrupted by additive poisson noise, respectively.
Figure 13:

FIGS. 12 and 13 are examples of related images. FIG. 12 is an original, unmodified image 1102. FIG. 13 is a modified image 1202 of image 1102 that has been distorted with additive poison noise. As addressed in greater detail below, a wide range of distortions for example, print-scan distortions, JPEG compression, cropping, rotation, and changes in brightness and/or contrast, changes in color, may all be modeled as distortions in a selected transforms domain representation of an image. However, an NNMA image digest generated in a manner similar to that described above with respect to FIG. 5 and FIG. 6, based on a matched Bregman distance generated in a manner similar to that described above with respect to FIG. 3 and FIG. 4, is robust to such distortions and/or combinations of such distortions. Therefore, such distortions may be applied to a photograph without significantly altering its respective NNMA image digest.

For this reason, an NNMA image digest generated for an original image may sufficiently match the NNMA image digest generated for a distorted version of the original image. Therefore, related images, i.e., original and/or distorted versions of the original image, may be identified by their respective NNMA image digests. In other words, if two NNMA image digests are sufficiently close to one another, the two images associated with the respective NNMA image digests are likely variations of the same image.

Figure 14:
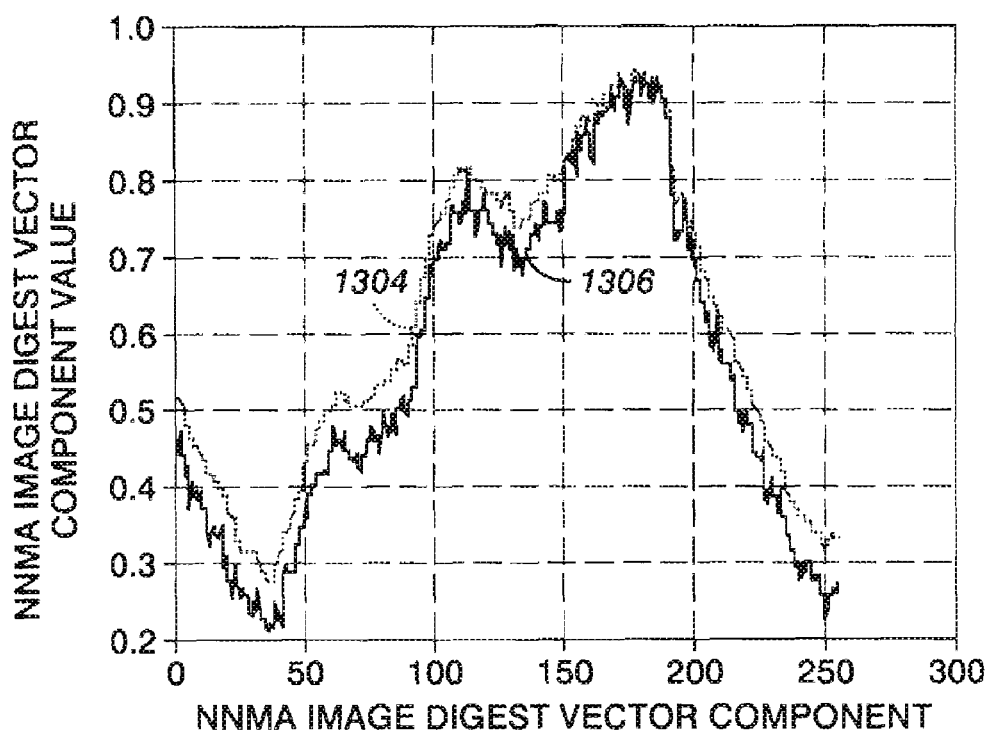
FIG. 14 compares plots of an exemplary NNMA image digest vectors generated using a Frobenius norm for the original image and distorted image presented in FIG. 12 and FIG. 13, respectively.

FIG. 14 compares a plot 1304 of an exemplary NNMA image digest corresponding to the original image presented in FIG. 12 with a plot 1306 of an exemplary NNMA image digest corresponding to the distorted image presented in FIG. 12, the image digests created using a Frobenius norm that has not been matched to the poisson noise distortion. In both plots presented in FIG. 14, a magnitude of an NNMA image digest vector component values represented by the Y-axis, is plotted for individual NNMA image digest vector components, represented by the X-axis.

Figure 15:
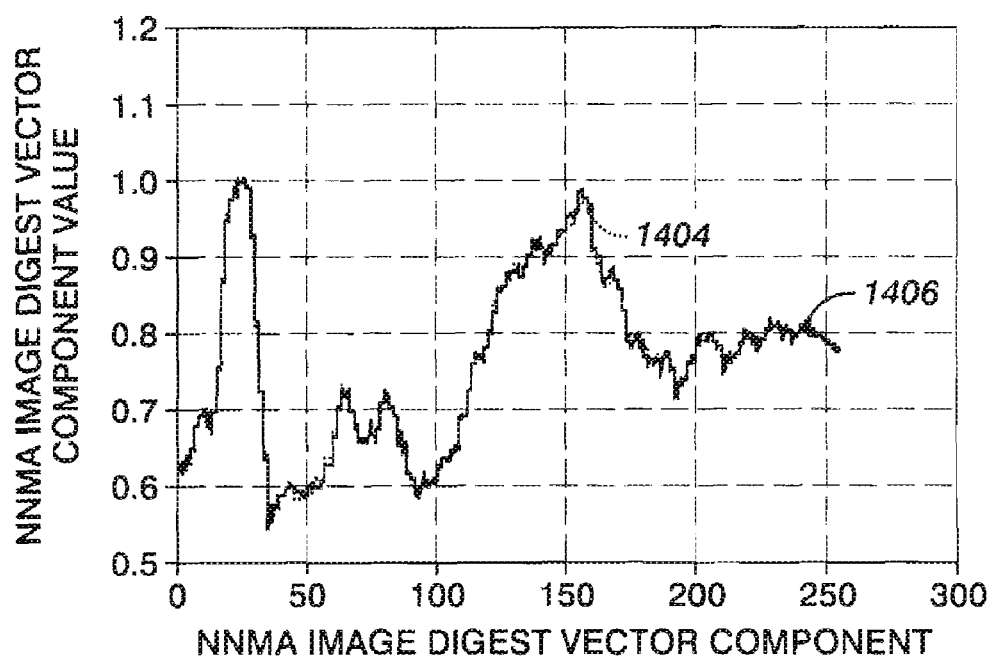
FIG. 15 compares plots of an exemplary NNMA image digest vectors generated using a Bregman distance matched to the poisson noise for the original image and distorted image presented in FIG. 12 and FIG. 13, respectively.

FIG. 15 compares a plot 1404 of an exemplary NNMA image digest corresponding to the original image presented in FIG. 12 with a plot 1406 of an exemplary NNMA image digest corresponding to a distorted image presented in FIG. 13, the image digests created using a Bregman distance that has been matched to the poisson noise distortion, as described above with respect to FIG. 3 through FIG. 6. In both plots presented in FIG. 15, a magnitude of an NNMA image digest vector component value, represented by the Y-axis, is plotted for individual NNMA image digest vector components, represented by the X-axis.

FIG. 14 and FIG. 15 support the assertion, addressed in greater detail below, that an NNMA image digest generated in a manner similar to that described above with respect to FIG. 5 and FIG. 6, based on a matched Bregman distance generated in a manner similar to that described above with respect to FIG. 3 and FIG. 4, is robust to the distortion to which the Bregman distance has been matched. Therefore, such distortions may be applied to a photograph without significantly altering its respective NNMA image digest.

Figure 16:
FIG. 16 and FIG. 17 are examples of related images, including an original image, and a distorted version of the original image corrupted by printing and then scanning the original image, respectively.
Figure 17:
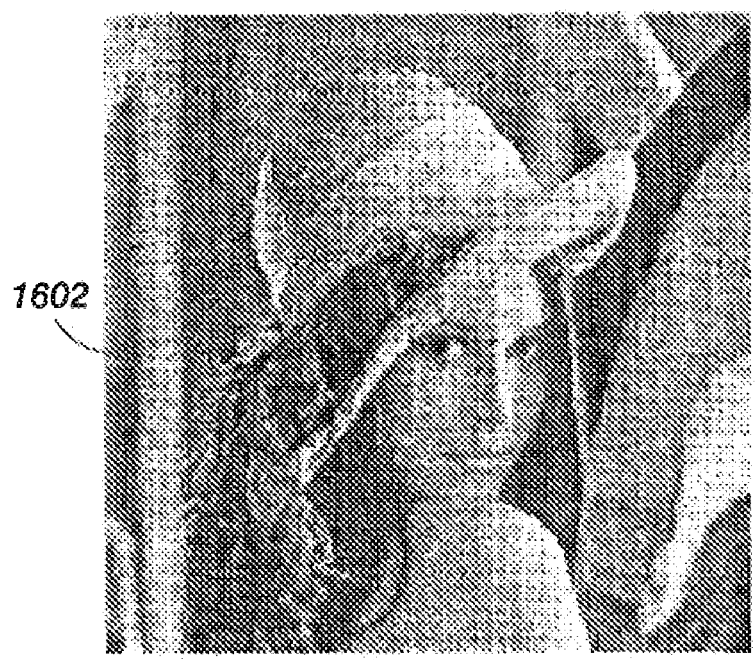

FIGS. 16 and 17 are further examples of related images. FIG. 16 is an original, unmodified image 1502. FIG. 17 is a modified image 1602 of image 1502 that has been printed and then scanned to generate a distorted version of the original image. Such distortion may be referred to as print-scan distortion and may vary based on the color, contrast, dots per inch (dpi) settings of the printer used to print the original image, as well as similar settings of the printer used to scan the image.

Figure 18:
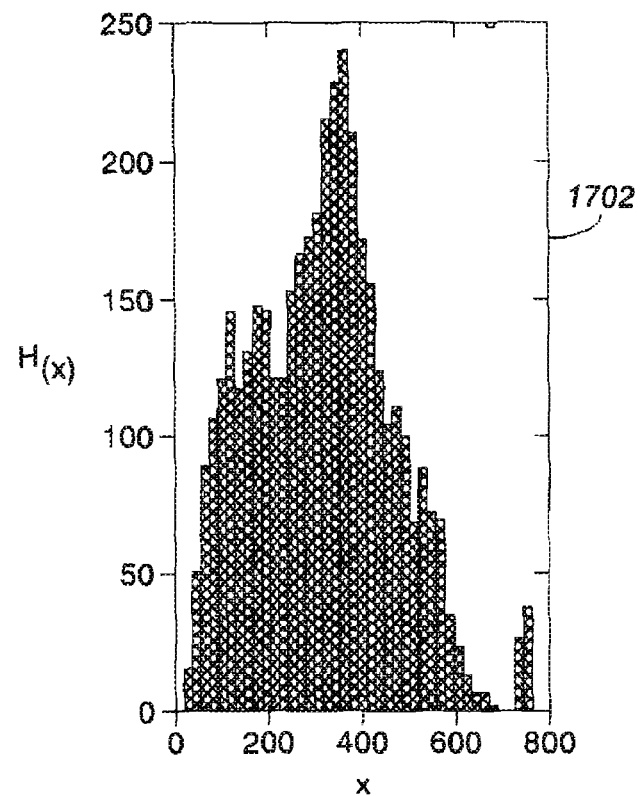
FIG. 18 is a histogram of DC-subband wavelet coefficients for the original image presented in FIG. 16.
Figure 19:
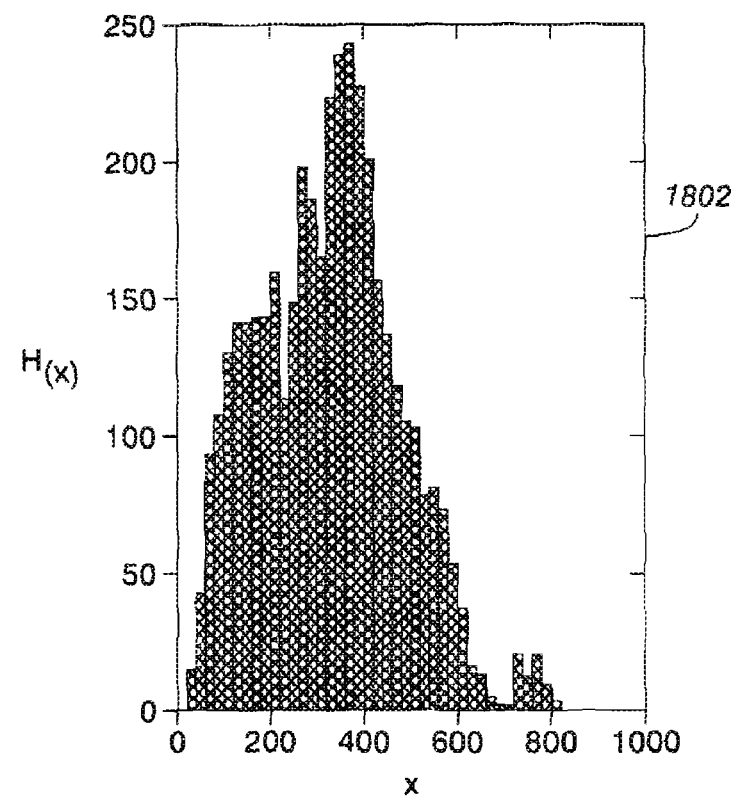
FIG. 19 is a histogram of DC-subband wavelet coefficients for the print-scan distorted image presented in FIG. 16.

FIG. 18 is a histogram 1702 of DC-subband wavelet coefficient values for the original image presented in FIG. 16, in which individual coefficients, x, are identified along the x-axis and the frequency of occurrence of x denoted by H(x) is shown in the y-axis direction. FIG. 19 is a histogram 1802 of DC-subband wavelet coefficients values for the print-scan distorted image presented in FIG. 17, in which individual coefficients, x, are identified along the x-axis and the frequency of occurrence of x denoted by H(x) is shown in the y-axis direction. As shown by the coefficient histograms presented in FIG. 18 and FIG. 19, the shape of the distribution, the mean and variance are approximately maintained. This demonstrates that the DC-sub-band wavelet coefficients exhibit excellent robustness under print-scan. In both histograms presented in FIG. 18 and FIG. 19, a magnitude of a DC-subband wavelet coefficient value, represented by the NT-axis, is plotted for individual DC-subband wavelet coefficients, represented by the X-axis.

Further, the DWT domain also has the ability to de-correlate noise due to printing and scanning. In particular, let W(i,j) represent the third-level low-low (LL3) subimage extracted from an original image and like-wise let $W_{ps}(i,j)$ represent the LL3 subimage resulting from a level-3 decomposition of a print-scan distorted copy of the original image. Then, the print-scan distortion may be modeled as an additive noise on the wavelet coefficients given by $$w_{ps}(i,j)=w(i,j)+n(i,j) \quad \text{EQN. 6}$$

A statistical characterization of n(i,j) can be obtained by repeating the print-scan experiment on a large number of images.

Hence, the DWT is an example a transform function that may be used as described above with respect to FIG. 3 at steps S314 through step S320, to isolate, for example, print-scan distortion as additive noise to an original image.

As described in "A wavelet tour of signal processing," Academic Press 1999 by S. Mallat, the discrete wavelet transform (DWT) is accepted in image processing as a significant mathematical tools for image analysis. The wavelet domain is distinguished from other classical domains like Fourier and discrete cosine transform (DCT) by the fact that the wavelet signal decomposition is multi-resolution. DWT performs a multi-resolution wavelet decomposition via filtering and down-sampling operations, each filtered and down sampled image carrying significant image information.

For example, a typical DWT may involve correlating an image with a series, e.g. two basis functions, or filters f1 and f2, to obtain, for example, two new images in the transform domain. Each of the two transform domain images may then be down-sampled, again filtered with filters f1 and f2, and down-sampled again, resulting in four sub-images known as the: low-low subimage (LL1), low-high sub-image (LH1), high-low sub-image (HL1), and high-high (HH1) sub-images. The abbreviated nomenclature, e.g. LH1 derives from the fact that f1 is a low-pass filter, f2 is a high-pass filter and the suffix "1" is because these sub-images result from a level 1 decomposition.

The DWT process, described above may be repeated multiple, e.g. P times where P is any integer. The coarse approximation or LL image at any level serves as the image to be decomposed at the higher level making the LH, HL and HH to be relatively low-frequency as compared to the LH, HL and HH images at a higher resolution. As a result, P applications of the DWT operator would hence in $4^P$ sub-images—4 at each resolution or level P. Using the DWT, the LL image after each step presents a coarse approximation to the original high-resolution version. In other words, the coefficients in the LL image represent low-frequency content. The LH, HL and HH images represent frequency content in the horizontal, vertical and diagonal directions.

DWT has at least two characteristics that make the transform well suited for use as a transform function as described above with respect to the processes described above with respect to FIG. 3 through FIG. 11. First, the transform captures joint time-frequency characteristics owing to its multi-resolution nature making it a better representation to capture local changes in the signal unlike global representations like Fourier and DCT. Second, the filtering operations f1 and f2 may be chosen to provide meaningful basis for a large class of applications like compression, image denoising, texture analysis etc.

In exemplary embodiments the DWT decompositions may be based on filters f1 and f2 being chosen as Daubechies 4 wavelet pair, as described in described in "A wavelet tour of signal processing," Academic Press 1999, by S. Mallat. These filters are commercially available as option 'db4' in MATLAB.

The DWT LL representation offers a coarse image representation it is also a robust image representation. This means that if small changes are made to the image, they will cause only minor perturbations to the LL image for a sufficiently large level P. Further, the LL image captures both time and frequency content, so significant local changes, e.g. image content changes such as replacing a pepper which is a small portion of an overall image with an apple, are still captured.

Figure 20:
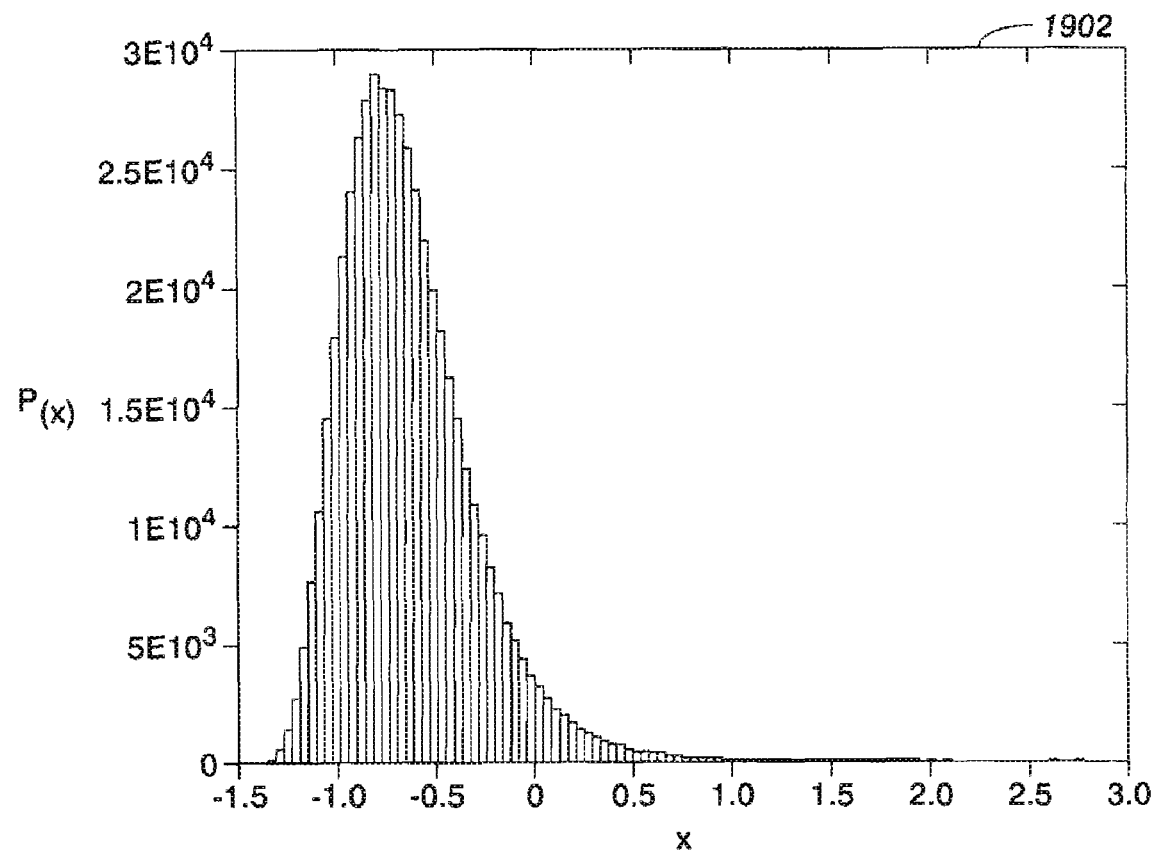
FIG. 20 is a plot of the noise characteristics of the print-scan distortion associated with the distorted image presented in FIG. 17.
Figure 21:
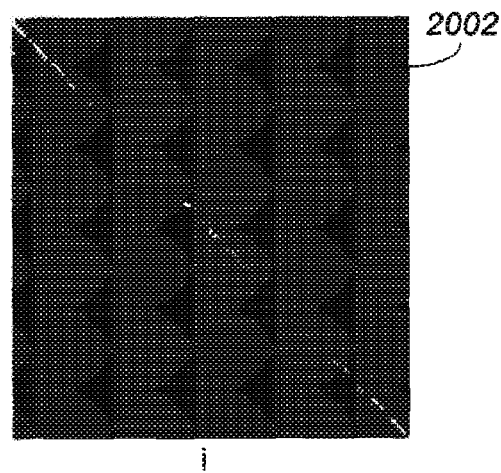
FIG. 21 is a plot of the covariance matrix for print-scan noise characteristics of FIG. 20.

FIG. 20 is a plot 1902 of the noise characteristics of the print-scan distorted image presented in FIG. 18. The noise histogram values, p(x), presented in FIG. 20 were realized from obtaining noise values, x, on wavelet coefficients from 40 different images. FIG. 21 is a visualization 2002 of the noise covariance matrix, $C_n(i,j)$, where n is the vector representation of all the noise, for the determined print-scan noise characteristics shown in FIG. 20. In the visualization shown in FIG. 21, a value of $C_n(i,j)$ generated for each matrix element (i,j) is represented as one of 256 grayscale shades in which white represents the highest resulting value of $C_n(i,j)$, black represents the lowest resulting value of $C_n(i,j)$, and lighter grayscale shades represent higher values of $C_n(i,j)$ than darker grayscale shades. As shown in FIG. 21, high values of the noise covariance matrix are aligned with the matrix diagonal.

FIG. 20 and FIG. 21, combined establish that the print-scan noise is approximately independent and identically distributed (i.i.d.). In fact, analysis of the noise and determined that the noise may be fit to a Gamma distribution given by $$f_X(x, \theta, k) = \frac{x^{k-1} e^{-\frac{x}{\theta}}}{\theta^k \cdot \Gamma(k)} \quad \text{EQN. 7}$$

where $\theta$ and $k \geq 2$ are distribution parameters. In particular, the plot in FIG. 20 fits very closely the case of k=2.

For reasons described in greater detail below, the DWT may be used as the transform function in the matched Bregman based image digest processes described above with respect to FIG. 3 through FIG. 11 under a Bregman distance $D\phi$ given by $$D_\varphi(x, \mu) = \frac{x}{\mu} - \ln x + \ln \mu - 1 \quad \text{EQN. 8}$$

With respect to determining an appropriate nonnegative matrix approximation of reduced coefficient matrix $IF_F$ in step S516, of FIG. 5, described above, given a nonnegative matrix A as input, the classical NNMA problem is to approximate it by a lower rank non-negative matrix of the form BC, where B and C are themselves nonnegative matrices such that $$A_{M \times N} \approx B_{M \times K} \cdot C_{K \times N}, \text{ where } B, C \geq 0 \quad \text{EQN. 9}$$

or equivalently, the columns $\{a_j\}$ j=1, 2, . . . , N are approximated such that $$a_j \approx B \cdot c_j, \text{ where } a_j \in R^M \text{ and } c_j \in R^K \quad \text{EQN. 10}$$

For the class of full (nonsparse) matrices, this provides a reduction in storage whenever the number of vectors K, in the basis W is chosen such that K<MN/(M+N). In practice, K is selected so that K<<(M,N). For exemplary formal approaches for choosing a good K, see I. S. Dhillon and S. Sra, Generalized Non-negative Matrix Approximations with Bregman Divergences, *UTCS Technical Report # TR-xx*-05, June 2005.

As described in the above referenced article by I. S. Dhillon and S. Sra, the goodness of the approximation is quantified by using a general class of distortion measures called Bregman divergences. For any strictly convex function $\phi: S \subseteq R \to R$ that has a continuous first derivative, the corresponding Bregman divergence D $\phi$: S×int(S)→$R^+$ is defined as $$D_\phi(x,y) = \phi(x) - \phi(y) - \nabla \phi(y)(x-y) \quad \text{EQN. 11}$$

where int(S) is the interior of set S.

Bregman divergences are nonnegative, convex in the first argument and zero, if and only if, x=y. Bregman divergences on equal size matrices X and Y may then be defined as $$D_\varphi(X, Y) = \sum_{i,j} D_\varphi(x_{ij}, y_{ij})  \qquad \text{EQN. 12}$$

where $x_{ij}, y_{ij} \in \text{domain}(\varphi) \cap R^+$

And the resulting generalized nonnegative matrix approximation problems are:

$$(B^*, C^*) = \underset{B,C}{\operatorname{argmin}} D_\varphi(A, BC) \qquad \text{EQN. 13}$$

An important concern for constructing image digests is the availability of fast algorithms to obtain such low-rank approximations for a desired K.

While iterative gradient methods could be used to solve for B* and C*, such schemes would invariably be too slow. In 2005, Sra and Dhillon proposed fast algorithms for obtaining matrices B* and C*. See I. S. Dhillon and S. Sra, Generalized Non-negative Matrix Approximations with Bregman Divergences, *UTCS Technical Report # TR-xx-05*, June 2005.

We may re-write the matrix approximation as:

$$[a_1, a_2, \ldots, a_N] \approx \begin{bmatrix} b_1 \\ b_2 \\ \vdots \\ b_M \end{bmatrix} [c_1, c_2, \ldots, c_N] \qquad \text{EQN. 14}$$

where $a_i \in R^M, b_i \in R^K, c_i \in R^K$

Theorem: The Bregman-distance $D\phi(A, BC)$ is non-increasing under the following update rules $$c_{j+1} \leftarrow c_j \cdot \psi^{-1}\left(\frac{[B^T \psi(a)]_j}{[B^T \psi(Bc)]_j}\right) \qquad \text{EQN. 15}$$

$$b_{j+1} \leftarrow b_j \cdot \psi^{-1}\left(\frac{[\psi(a^T)C^T]_j}{[\psi(b^T C)C^T]_j}\right) \qquad \text{EQN. 16}$$

where $\psi = \nabla \varphi$

Proof of this theorem may be found in the article by Sra and Dhillon referenced above. The updates to the rows of B and the columns of C are multiplicative and the multiplicative factor is unity when A=BC so that perfect reconstruction is achieved.

As described above with respect to FIG. 3, at step S322, noise data collected for a selected set of images may be processed and fit to an exponential family of equations of the type $\alpha \cdot e^{-\beta \cdot D_\phi(x,\mu)}$ that is matched to a Bregman distance. Solving dimensionality reduction problems that minimize Bregman distances have an alternate interpretation as maximizing the likelihood that the higher dimensional data is realized from a multivariate exponential family whose parameters lie in the desired lower-dimensional space.

For example, let us revisit the classical dimensionality reduction problem. Given a set of vectors $\{x_i\}$ i=1, 2, 3, ..., n such that $x_i$'s draw from a vector space X, the goal of a "classical" rank or dimensionality reduction scheme is to find a lower dimensional sub-space $\Theta$ that passes close to the $x_i$'s. In particular, if $\theta_i$ be the projection of $x_i$ such that $\theta_i$ is in $\Theta$, then the goal is to find the sub-space $\Theta$ or equivalently the projections $\theta_i$'s such that $$\{\theta_1, \theta_2, \ldots, \theta_n\} = \operatorname{argmin} \sum_{i=1}^{n} \|x_i - \theta_i\|^2 \qquad \text{EQN. 17}$$

To see an equivalence between the aforementioned problem and rank-reduction via singular value decomposition (SVD), $x_i$'s may be understood as the columns of the matrix X whose SVD is obtained and $\theta_i$'s be the reconstructed columns from the SVD basis vectors.

The interesting fact is that there is an equivalent but less known interpretation of the aforementioned result. In this probabilistic interpretation, each vector $x_i$ is thought of as a random draw from some unknown distribution $P_{\theta_i}$, where $P_\theta$ denotes a unit Gaussian with mean $\theta$. The purpose then of classical rank-reduction techniques like SVD or principal components analysis (PCA) can be interpreted as solving for the set of parameters $\{\theta_i\}$ i=1, 2, 3, ..., n that maximizes the likelihood of the data, subject to the constraint that $\{\theta_i\}$'s lie in the lower-dimensional sub-space $\Theta$.

To realize this, consider the joint probability distribution of $x_i$'s assuming they are independent random draws.

$$f_X(x_1, x_2, \ldots, x_n) = \prod_{i=1}^{n} \frac{1}{\sqrt{2\pi}} e^{-\frac{\|x_i - \theta_i\|^2}{2}} \qquad \text{EQN. 18}$$

In the alternate interpretation hence, we are trying to solve the following maximization problem $$\{\theta_1, \theta_2, \ldots, \theta_n\} = \operatorname{argmax} \prod_{i=1}^{n} \frac{1}{\sqrt{2\pi}} e^{-\frac{\|x_i - \theta_i\|^2}{2}} \qquad \text{EQN. 19}$$

subject to $\theta_i \in \Theta$

Which is the same as maximizing $$\frac{1}{(\sqrt{2\pi})^n} e^{-\Sigma_{i=1}^{n} \frac{\|x_i - \theta_i\|^2}{2}} \qquad \text{EQN. 20}$$

Or maximizing $$\ln\left(\frac{1}{(\sqrt{2\pi})^n} e^{-\sum_{i=1}^{n}\frac{\|x_i-\theta_i\|^2}{2}}\right) \quad \text{EQN. 21}$$

Because ln or natural log is an increasing function, this is same as maximizing $$-n\ln(\sqrt{2\pi}) + \frac{1}{2} - \sum_{i=1}^{n}\|x_i - \theta_i\|^2 \quad \text{EQN. 22}$$

Because the first two terms are constants, this is same as maximizing $$-\sum_{i=1}^{n}\|x_i - \theta_i\|^2 \quad \text{EQN. 23}$$

which is the same as minimizing $$\sum_{i=1}^{n}\|x_i - \theta_i\|^2 \quad \text{EQN. 24}$$

We have therefore established an equivalence between the dimensionality reduction problem under the squared distance and a maximum likelihood problem where the lower-dimension vectors are solved as parameters that maximize the probability that the $x_i$'s are instances of multivariate Guassians.

It is important to note here that the above analysis applies to not just Gaussians and squared distance, but to exponential family distributions and Bregman distances given by $$\alpha \cdot e^{-\beta \cdot D_\phi(x,\mu)} \Leftrightarrow D_\phi(x,\mu) \quad \text{EQN. 25}$$

where $D\phi(x,y)$ is the Bregman distance as defined in equation 11. Therefore, solving dimensionality reduction problems that minimize Bregman distances have an alternate interpretation as maximizing the likelihood that the higher dimensional data is realized from a multivariate exponential family whose parameters lie in the desired lower-dimensional space.

Extending the probabilistic interpretation we may think of $x_i$'s as deterministic unknowns corrupted by zero mean exponential noise. It is here that this interpretation carries profound implications for image digests. Keeping the above dual interpretation in view, the statement above implies that the knowledge of the statistical nature (i.e. distribution) of the noise that corrupts the data then points you to the particular Bregman distance that you should pick to do the dimensionality reduction. The perceptually insignificant distortions may then be thought of as introducing noise on the original image coefficients in an appropriate domain. Such noise may be characterized as described above with respect to FIG. 3 and FIG. 4, subsequently doing dimensionality reduction under the matched Bregman distance may be performed in the generation of image digests using the method described above with respect to FIG. 5 an FIG. 6.

Figure 22:
FIG. 22, FIG. 23, FIG. 24 and FIG. 25 present two pairs of related images, the first image in each pair, i.e.
Figure 23:
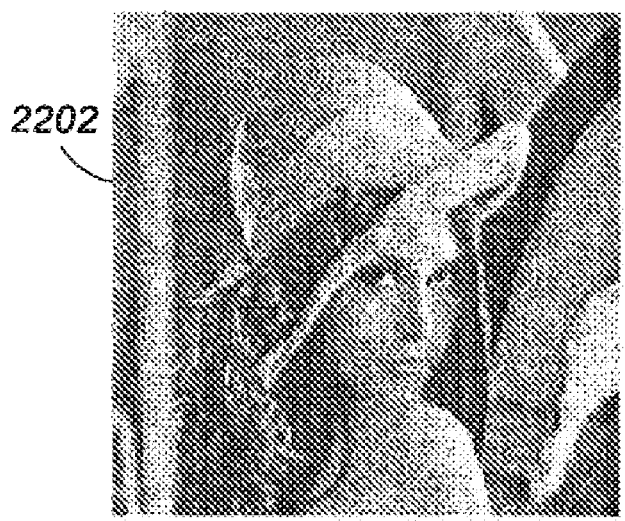
Figure 24:
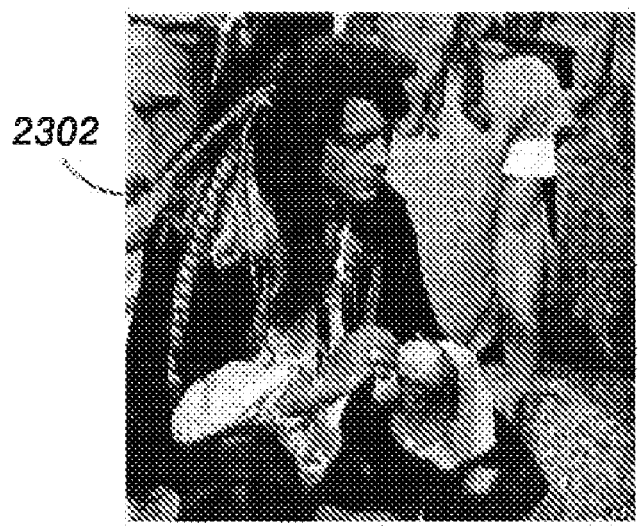
Figure 25:
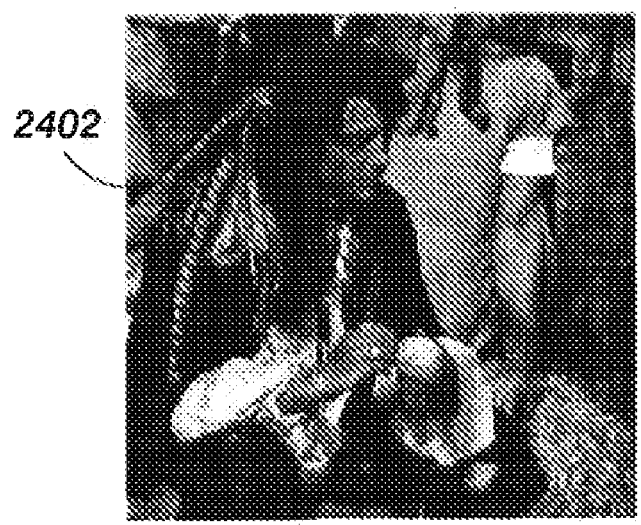

FIGS. 22 and 23 are an example of related images, including an original image 2102 and a print-scan distorted image 2202, respectively. Print-scan distorted image 2202 was generated by printing the original image 2102 at 150 dpi and scanning the printed image at 72 dpi. FIGS. 24 and 25 are another example of related images, including an original image 2302 and a print-scan distorted image 2402, respectively. Print-scan distorted image 2402 was generated by printing the original image 2302 at 150 dpi and scanning the printed image at 72 dpi.

Figure 26:
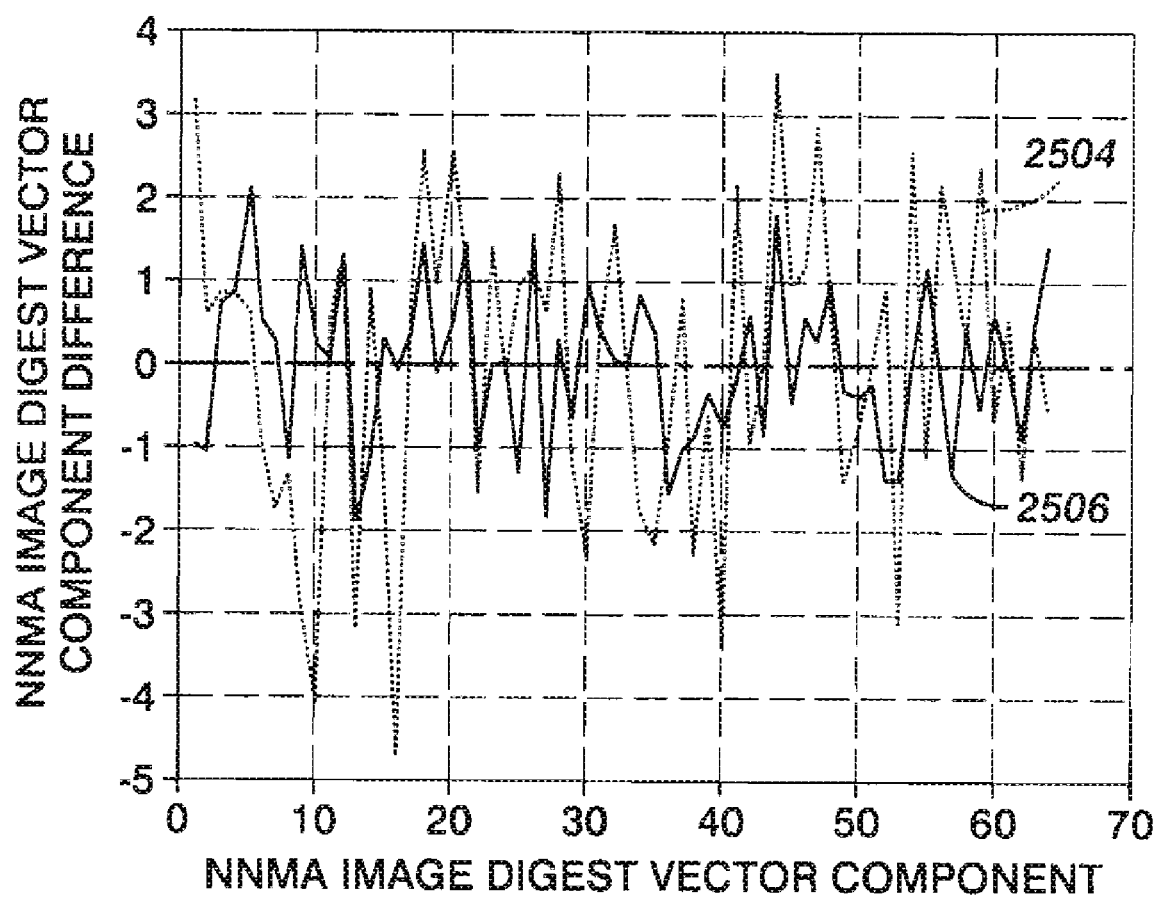
FIG. 26 compares a first plot of component-wise differences between an exemplary NNMA image digest vector generated for the image presented in FIG. 22 and an exemplary NNMA image digest vector generated for the image presented in FIG. 24, with a second plot of component-wise differences between an exemplary NNMA image digest vector generated for the original image presented in FIG. 22 and the NNMA image digest vector generated for the exemplary print-scan distorted version presented in FIG. 23.

FIG. 26 compares a first plot 2504 of component-wise differences between an exemplary NNMA image digest vector generated for the image presented in FIG. 22 and an exemplary NNMA image digest vector generated for the image presented in FIG. 24, with a second plot 2506 of component-wise differences between an exemplary NNMA image digest vector generated for the original image presented in FIG. 22 and the NNMA image digest vector generated for the exemplary print-scan distorted version presented in FIG. 23. In both plots presented in FIG. 26, a magnitude of a difference between NNMA image digest vector components, represented by the Y-axis, is plotted for individual NNMA image digest vector components, represented by the X-axis.

FIG. 26 demonstrates that the component-wise difference between the image digest vectors of the first original image, i.e., FIG. 22 and the second original image, i.e., FIG. 24 is degraded in quality, i.e., shows much greater energy than the component-wise difference between the image digest vectors of the first original image, i.e., FIG. 22 and matched Bregman distance based image digest for the print-scan distorted image 2202 generated by printing the original image 2102 at 150 dpi and scanning the printed image at 72 dpi. Given such a energy separation, it is possible to set a non-negative threshold to distinguish between an image and its print-scanned version vs. instances of two different images, as described above with respect to FIG. 10 and FIG. 11.

Figure 27:
FIG. 27 and FIG. 28 are examples of related images, including an original image, and a distorted version of the original image corrupted by print-scan distortion, rotation and cropping.
Figure 28:
Figure 29:
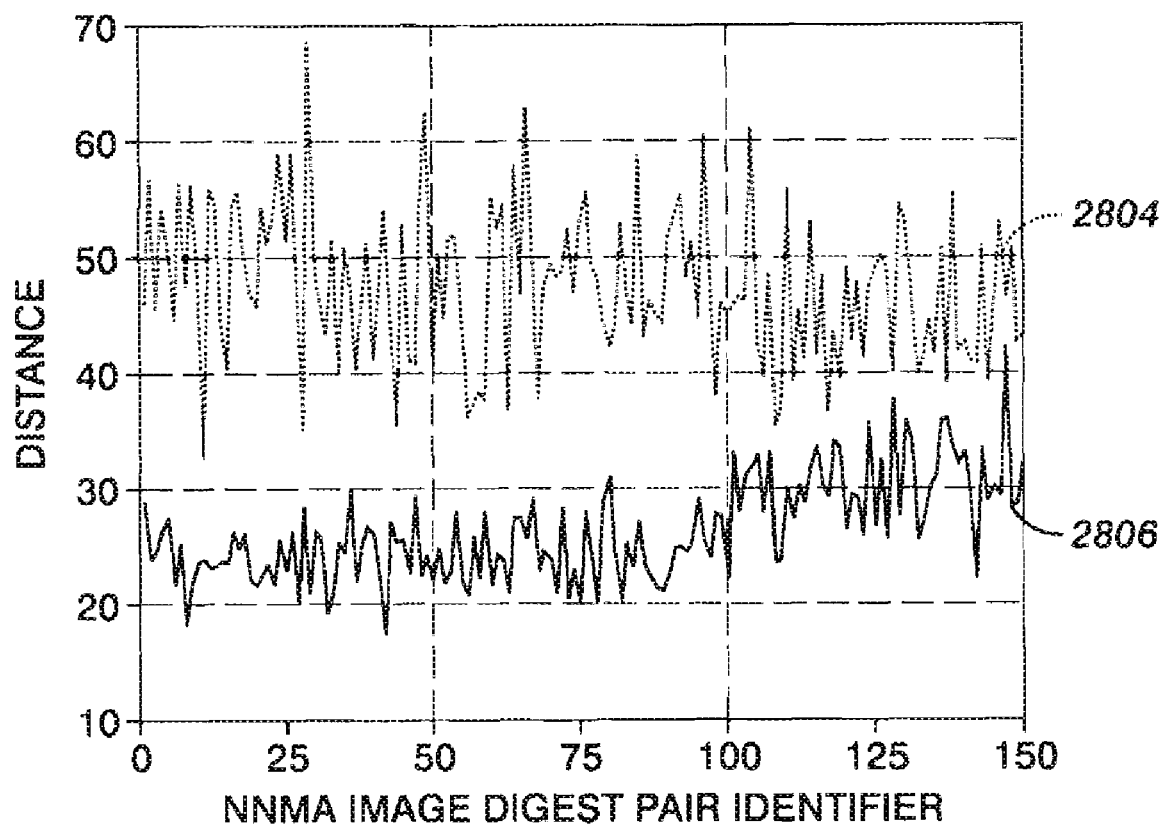
FIG. 29 compares a first plot in which each of one-hundred and fifty plotted points represents a distance between the NNMA image digests associated with each image in a pair of images randomly selected from an image repository, with a second plot in which each of one-hundred and fifty plotted points represents a distance between the NNMA image digests associated with each image in a pair of images that includes an original image and a print-scan distorted version of the original image, such as the original and print-scan distorted images presented in FIG. 27 and FIG. 28, respectively.

FIG. 27 and FIG. 28 are examples of related images, including an original image 2602, and a distorted version of the original image 2702 corrupted by print-scan distortion, rotation and cropping. FIG. 29 compares a first plot 2804 in which each of one-hundred and fifty plotted points represents a distance between the NNMA image digests associated with each image in a pair of images randomly selected from an image repository, with a second plot 2806 in which each of one-hundred and fifty plotted points represents a distance between the NNMA image digests associated with each image in a pair of images that includes an original image and a print-scan distorted version of the original image, such as the original and print-scan distorted images presented in FIG. 27 and FIG. 28, respectively.

Note the probabilities above are defined by conducting tests over a large number of images. In the test results discussed presented in FIG. 29, image digests were obtained from one-hundred and fifty different images in a repository. For each image, distorted versions of the image were created by printing an original image at 150 dpi, scanning the image at 72 dpi, and introducing up to 15% rotation and up to 30% cropping along the vertical and horizontal directions. In the context of the processes described above with respect to FIG. 3 through FIG. 11, such a combination of distortions could be defined as a single distortion type with one or more associated processing types, each distortion type/processing type combination having its own stored distance threshold, or as three separate distortion type with one or more associated processing types, each distortion type/processing type combination having its own stored distance threshold.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art which are also intended to be encompassed by the following claims.

What is claimed is:

1. An image digest processing device, comprising:
a Bregman distance matching unit that generates a Bregman distance based, in part, on a generated model of a distortion type within a selected set of images;
a transformation unit that generates a transform domain representation of an image within the selected set of images based, in part, on a selected transform function;
an approximation unit that generates a nonnegative matrix approximation of the transform domain representation of the image based, in part, on the generated Bregman distance;
a digest creation unit that generates an image digest based on the generated nonnegative matrix approximation;
a Bregman distance repository that includes a storage area that stores the generated Bregman distance in association with the distortion type;
a storage area for the selected transform function in association with the stored Bregman distance;
a threshold determining unit that determines a threshold difference used to identify a match between a digest associated with a query image and an image digest associated with an image in an image repository; and
a search unit that searches the image repository based on an image digest generated for a user selected query image and the determined threshold difference, wherein:
the search unit determines a distance between one or more generated image digests and one or more image digests associated with an image in the image repository and identifies the image in the image repository in a search report if a distance is less than a predetermined threshold value,
the predetermined threshold value depends on a lower threshold value and an upper threshold value, the lower threshold value and the upper threshold value being calculated based on the repository of stored distances for the selected distortion type, and
the lower threshold value and the upper threshold value are stored for subsequent review by a user.

2. The image digest processing device of claim 1, further comprising:
a reduction unit that reduces a number of coefficients in the transform domain representation of the image prior to the approximation unit generating the nonnegative matrix approximation.

3. The image digest processing device of claim 1, further comprising:
an image repository that includes a plurality of image digests, one or more of the plurality of image digests stored in association with a separate one of a plurality of images stored in the image repository from which each of the respective image digests was generated.

4. The image digest processing device of claim 1, wherein the generated model of the distortion type is based on a fit of a noise data to an exponential family of equations matched to a Bregman distance.

5. The image digest processing device of claim 1, wherein the transform function is a discrete waveform transform.

6. A method of searching an image repository for images related to a query image, the method comprising:
generating a Bregman distance based, in part, on a generated model of a distortion type within a selected set of images;
generating a transform domain representation of an image within the selected set of images based, in part, on a selected transform function;
generating a nonnegative matrix approximation of the transform domain representation of the image based, in part, on the generated Bregman distance;
generating an image digest based on the generated nonnegative matrix approximation;
storing the generated Bregman distance in association with the distortion type;
storing the selected transform function in association with the stored Bregman distance;
determining a threshold difference used to identify a match between a digest associated with a query image and an image digest associated with an image in an image repository;
searching the image repository based on an image digest generated for a user selected query image and the determined threshold difference;
determining a distance between one or more generated image digests and one or more image digests associated with an image in the image repository; and
identifying the image in the image repository in a search report if a distance is less than a predetermined threshold value, wherein:
the predetermined threshold value depends on a lower threshold value and an upper threshold value, the lower threshold value and the upper threshold value being calculated based on the repository of stored distances for the selected distortion type, and
the lower threshold value and the upper threshold value stored for subsequent review by a user.

7. The method of claim 6, further comprising:
reducing a number of coefficients in the transform domain representation of the image prior to generating the nonnegative matrix approximation.

8. The method of claim 6,
wherein the generated model of the distortion type is based on a fit of a noise data to an exponential family of equations matched to a Bregman distance.

* * * * *